US012755645B2

(12) United States Patent
Pollack et al.

(10) Patent No.: US 12,755,645 B2
(45) Date of Patent: Oct. 6, 2026

(54) TECHNOLOGY AND SYSTEMS TO DEVELOP READING FLUENCY THROUGH AN INTERACTIVE, MULTI-SENSORY READING EXPERIENCE

(71) Applicants: Lindsey Kay Pollack, Los Altos, CA (US); Andrew H. Vyrros, San Francisco, CA (US)

(72) Inventors: Lindsey Kay Pollack, Los Altos, CA (US); Andrew H. Vyrros, San Francisco, CA (US)

( * ) Notice: Subject to any disclaimer, the term of this patent is extended or adjusted under 35 U.S.C. 154(b) by 257 days.

(21) Appl. No.: 18/539,878

(22) Filed: Dec. 14, 2023

(65) Prior Publication Data

US 2024/0233571 A1 Jul. 11, 2024

Related U.S. Application Data

(60) Provisional application No. 63/479,456, filed on Jan. 11, 2023.

(51) Int. Cl.

*G10L 25/87* (2013.01)
*G01S 5/02* (2010.01)
*G09B 17/00* (2006.01)
*G10L 13/08* (2013.01)

(52) U.S. Cl.

CPC .......... *G09B 17/006* (2013.01); *G01S 5/0249* (2020.05); *G10L 13/08* (2013.01); *G10L 25/87* (2013.01)

(58) Field of Classification Search

CPC ..... G09B 17/006; G01S 5/0249; G10L 13/08; G10L 25/87; G10L 13/00; G10L 21/10

See application file for complete search history.

(56) References Cited

U.S. PATENT DOCUMENTS

| | | | | | |
|---|---|---|---|---|---|
| 7,260,533 | B2 * | 8/2007 | Kamanaka | G10L 13/07 704/260 |
| 2009/0048843 | A1 * | 2/2009 | Nitisaroj | G10L 13/10 704/260 |
| 2009/0313020 | A1 * | 12/2009 | Koivunen | G06F 3/04847 704/260 |
| 2012/0310642 | A1 * | 12/2012 | Cao | G10L 13/00 704/235 |
| 2023/0122824 | A1 * | 4/2023 | Narayanan | G10L 13/08 704/200 |
| 2023/0154352 | A1 * | 5/2023 | Shemyakina | G09B 17/006 |

* cited by examiner

*Primary Examiner* — Eddy Saint-Vil
(74) *Attorney, Agent, or Firm* — Patterson + Sheridan, LLP

(57) ABSTRACT

Technology and systems to develop reading fluency through an interactive, multi-sensory reading experience, include a computing platform that receives position data associated with motion of a user, periodically computes position, speed, and direction of the motion of the user based on the position data, correlates the position and the direction to a sequence of pronounceable characters of a textual passage presented to the user, and performs an action with respect to the sequence of pronounceable characters, contemporaneous with the motion of the user, based on the correlation. The action may include audibly presenting the sequence of pronounceable characters contemporaneous with the motion of the user and/or visually accentuating the sequence of pronounceable characters contemporaneous with the motion of the user. The computing platform may visually demarcate sections of the textual passage to indicate where a reader is to pause or slow down.

20 Claims, 17 Drawing Sheets

TECHNOLOGY AND SYSTEMS TO DEVELOP READING FLUENCY THROUGH AN INTERACTIVE, MULTI-SENSORY READING EXPERIENCE

RELATED APPLICATION

This application claims the benefit of U.S. Provisional Patent Application No. 63/479,456, titled "Technology and Systems to Develop Reading Fluency Through an Interactive, Multi-Sensory Reading Experience," filed Jan. 11, 2023, which is incorporated herein by reference in its entirety.

TECHNICAL FIELD

Examples of the present disclosure generally relate to technology and systems to develop reading fluency through an interactive, multi-sensory reading experience.

BACKGROUND

Learning to read is one of the most fundamental building blocks in a person's education. A text-to-speech system audibly presents a textual passage, without regard to whether a user is attentive to the textual passage, and is thus not necessarily useful for improving reading ability.

SUMMARY

Technology and systems to develop reading fluency through an interactive, multi-sensory reading experience are disclosed herein. One example is a computer program that includes instructions to cause a processor to receive a stream of 2-dimensional position data associated with motion of a user, periodically compute position, speed, and direction of the motion of the user based on the stream of 2-dimensional position data, correlate the position and the direction of the motion of the user to a sequence of pronounceable characters of a textual passage presented to the user, and perform an action with respect to the sequence of pronounceable characters, contemporaneous with the motion of the user, based on the correlation.

Another example is a system that includes a local device having a processor and memory that stores instruction that, when executed by the processor, cause the processor to receive a textual file and an audio file from a server, where the textual file includes a textual passage and the audio file includes an audible representation of the textual passage, display the textual passage to a user of the local device, receive a stream of 2-dimensional position data associated with motion of the user, periodically compute position, speed, and direction of the motion of the user based on the stream of 2-dimensional position data, correlate the position and the direction of the motion of the user to a sequence of pronounceable characters of the textual passage displayed to the user, and perform an action with respect to the sequence of pronounceable characters, contemporaneous with the motion of the user, based on the correlation.

Another example described herein is method that includes determining characteristics of a textual passage, where the characteristics include one or more of context, phrases, emotions associated with the phrases, polysemous words, and context-based meanings of the polysemous words. The method further includes annotating the textual passage with segment demarcations based on the characteristics, correlating an audible representation of the textual passage to the textual passage, and annotating the audible representation of the textual passage based on the segment demarcations.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
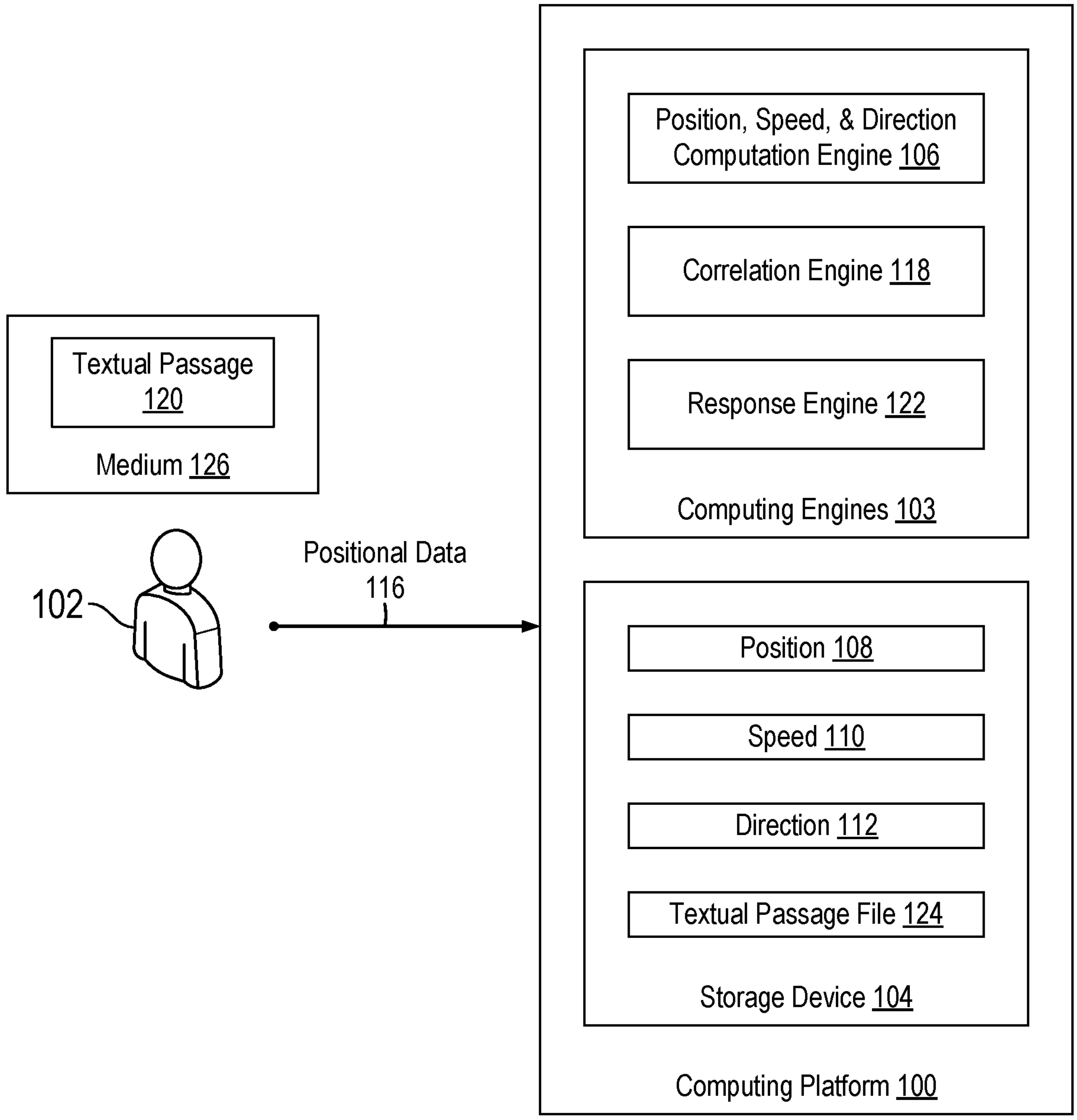
FIG. 1 is a block diagram of computing platform that provides a multi-sensory and interactive reading environment to a user, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Disclosed herein are technologies and systems to develop reading fluency through an interactive, multi-sensory reading experience.

Learning to read is one of the most fundamental building blocks in a person's education. There are countless books, curricula, and applications devoted to helping people learn this crucial skill. It is well understood that regardless of whether a person is trying to learn a secondary language, or suffers from a language-based learning disorder, such as dyslexia, repeated exposure to fluently-read connected text (e.g. books, essays, passages, scripts, cartoons), plays an important role in helping people develop reading skills.

Ultimately, the goal of any reading is, of course, to comprehend the fullness of the sentences on the page. It is well known that reading comprehension requires the foundational skills of decoding, and fluency. While decoding is the ability to translate symbols into sounds through the rules of phonics, fluency is the ability to string words together into sentences with appropriate speed, accuracy, and prosody. Only after a certain level of reading fluency has been achieved, can a reader utilize their working memory not on just decoding, but on comprehension, interpretation, and drawing connections to relevant background knowledge.

While all developing readers benefit from repeated exposure to fluent reading, and require practice to develop their reading fluency, dyslexic learners require many more hours of practice to reach reading mastery, and benefit from repeated readings of the same material. Additionally, dyslexic learners require reading interventions that are explicit, systematic, structured, and multi-sensory (e.g. The Orton-Gillingham approach), which teach the skills required to decode individual words, and to recognize "sight words"—words which do not follow decoding rules (e.g. the, was, does, for).

The multi-sensory process of listening to books being read, while looking at the text being read, is one of the most common methods used to expose children to fluently read connected texts in their early development. (e.g., a parent reading to their child, pointing to words as they read). A text-to-speech device does not adequately replicate this experience. Rather, the user's role (e.g., a child) is primarily passive and un-engaged, and, notably, there is no guarantee that the user is visually tracking the specific words being read aloud, simultaneously with the audio output. For children with attention disorders (e.g., ADHD), it is even more unlikely that the child sustains their gaze on the appropriate portion of a screen. A text-to-speech device thus mimics a single-sensory audio book, which may exercise listening comprehension skills but not reading fluency. A text-to-speech device may in fact, reinforce incorrect word-sound recognition if a child persistently looks at the wrong text while other audio is being read aloud. Because ADHD and dyslexia are highly co-morbid, for children who suffer from both, a text-to-speech device may be especially insufficient.

Disclosed herein are interactive technologies and systems that model excellent fluency while ensuring that the intended target is receiving the full multi-sensory experience, truly connecting each written word synchronously with its sounds. Interactive technology and systems disclosed herein allow a user to have control over their reading experience, not just pressing a play button to playback audio, but having the ability to go back and re-read sections they like, or re-examine words they don't recognize, as is done by proficient readers. Interactive techniques and systems disclosed herein may be useful to help users develop reading fluency. Interactive techniques and systems disclosed herein provide additional benefits, such as improving "sight word" recognition through repeated exposure, and growing the vocabulary of struggling readers. A limited vocabulary is a sad but frequent side effect for dyslexic children who often are exposed only to very basic texts, far below their cognitive potential. Research has shown that learning vocabulary in the context of engaging connected text is highly effective, as compared to learning vocabulary through other methods (like flash cards).

Interactive techniques and systems disclosed herein are scalable, in that they help emerging readers develop reading fluency without requiring the time and expertise of a fluent adult, and thus may be useful in homes and classrooms, particularly in classrooms and homes with children diagnosed with dyslexia and/or ADHD.

Interactive techniques and systems disclosed herein provide a multi-sensory and interactive reading experience, in which an emerging reader is guided to practice the crucial skill of reading fluently: swiping their index finger (or other pointing device) under text, thereby tracking each word and phrase within a sentence, and hearing the text being fluently read aloud. Importantly, audio play occurs when the user swipes with specificity (e.g., directly below the text intended to be read), and the audio is synchronized to the user's swiping motion (i.e., playback speed varies based on swiping speed). In an embodiment, the user may also tap an individual word to hear the audio of just that word. Other motions/patterns may be used to provide other user feedback. The variable playback speed may be re-calculated with a relatively high frequency as compared to the swipe speed, to ensure the two stay in sync, and the pitch of the audio playback remains natural despite increases or decreases in the playback speed.

Interactive techniques and systems disclosed herein may be useful to ensure that senses employed (sight, touch, and hearing), are synchronously aligned such that the user hears, sees, and points to words concurrently.

In an embodiment, when the user motions toward a word (e.g., swipes or taps), the word is read aloud by the system, and it receives a word visual treatment (WVT) such as a color change or a highlight, to enhance engagement and attentiveness, and reinforce word recognition. Word visual treatments may be useful aids in word-sound recognition, and in visual tracking across line-breaks.

In an embodiment, visual cues are provided to guide a developing reader toward fluency. The visual cues, referred to herein as swipe guide-rails, or guide-rails, may take the form of a subtle line displayed just below the text, to show a developing reader where to swipe their finger to actively read, where to pause for appropriate phrasing, and how to interpret punctuation within sentences. A break in a swipe guide-rail line may indicate that a natural pause should be placed at that point in the text. For example, a swipe guide-rail may break at a period punctuating adjoining sentences.

Swipe guide-rails act as scaffolding to aid a developing reader to "chunk" a sentence into smaller, meaningful phrases. Breaking apart longer sentences into meaningful phrases is especially helpful for those whose working memory is limited, so that any cognitive resources available after decoding can be best utilized for comprehension. The scaffolding of the swipe guide-rails can be scaled-down, little by little, as a reader becomes more fluent. For example, the chunks of phrases within a sentence can become longer and more complex, as a developing reader becomes more fluent, until ultimately one swipe guide-rail may be the same length as the sentence itself, and may no longer be required.

If swipe guide-rails are not employed (for example if the user is proficient in chunking sentences unaided), the system will still help ensure a fluent reading experience through a series of strict requirements. That is, swiping a finger below the text in an intentional, reading-appropriate way, would trigger synchronous audio playback of the text, but swiping a finger in a way that is not appropriate for true reading would result in an error. For example, swiping below text at a speed that is far faster than appropriate for even the most fluent speaker would not result in super-speed audio playback, as that would not model the best fluent reading experience. Similarly, swiping right-to-left, if the language is a left-to-right language (such as English), would not result in audio playback.

Techniques and systems disclosed herein may be useful as an educational device to develop reading fluency and sight-word recognition and vocabulary and/or as an accessibility device. Any instance in which a user can point to a word or a sentence and hear it being read aloud can be immensely helpful for those who cannot read for themselves. The scaffolding of the swipe guide-rails is intended to help emerging readers develop their own fluency, but even without swipe guide-rails, the ability to point to a word and hear it being read is valuable.

FIG. 1 is a block diagram of computing platform 100 that provides a multi-sensory and interactive reading environment to a user 102, according to an embodiment. Computing platform 100 includes computing engines 103 and a storage device 104. In the example of FIG. 1, computing engines 103 include a position, speed, and direction computation engine 106 that determines positions 108, speeds 110, and directions 112 of motions of a user 102 based on positional data 116 related to user 102. Positional data 116 may relate to motion of a finger of user 102 and/or motion of a pointing device.

Computing engines 103 further include a correlation engine 118 that correlates positions 108 and directions 112 of motions of user 102 to sequences of pronounceable characters of a textual passage 120 that is physically proximate to user 102 (i.e., within a visual reading distance of user 102). Textual passage 120 may include, for example and without limitation, sentence/paragraph-based text, text embedded within images as in graphic novels, cartoons, or picture books, poems, song lyrics, tongue-twisters, jokes, and/or mathematical expressions/formulas. The sequences of pronounceable characters may include, for example and without limitation, alphabetic characters, numeric characters, alpha-numeric characters, mathematics characters, musical notes (e.g., based on a solmization system, such as the Solfège method), pictograms (e.g., emojis), characters associated with one or more standards such as, without limitation an American Standard Code for Information Interchange (ASCII) maintained by the Institute of Electrical and Electronics Engineers (IEEE) and/or a Unicode standard maintained by the Unicode Consortium, and/or other pronounceable characters.

Computing engines 103 further include a response engine 122 that performs one or more functions at rates that are based on speeds 110 of the motion of user 102, examples of which are provided further below.

In the example of FIG. 1, textual passage 120 is presented on a medium 126, which may include a printed medium (e.g., book), an electronic display, a projection surface, and/or other medium.

Computing engines 103 may include circuitry and/or a processor. Storage device 104 may include a non-transitory storage medium, such as volatile and/or non-volatile memory. Computing platform 100 may represent a single computing platform or multiple computing platforms, which may be centralized or distributed. For example, and without limitation, computing platform 100 may represent a user device (e.g., a mobile phone, a tablet device, a laptop computer, a desktop computer) and/or a remote computing platform (e.g., a cloud-based server). Computing platform 100 may include circuitry and/or a processor and memory that stores instructions for execution by the processor. As an example, and without limitation, medium 126 may represent a display of a user device, which may include computing platform 100, or a portion thereof.

Figure 2:
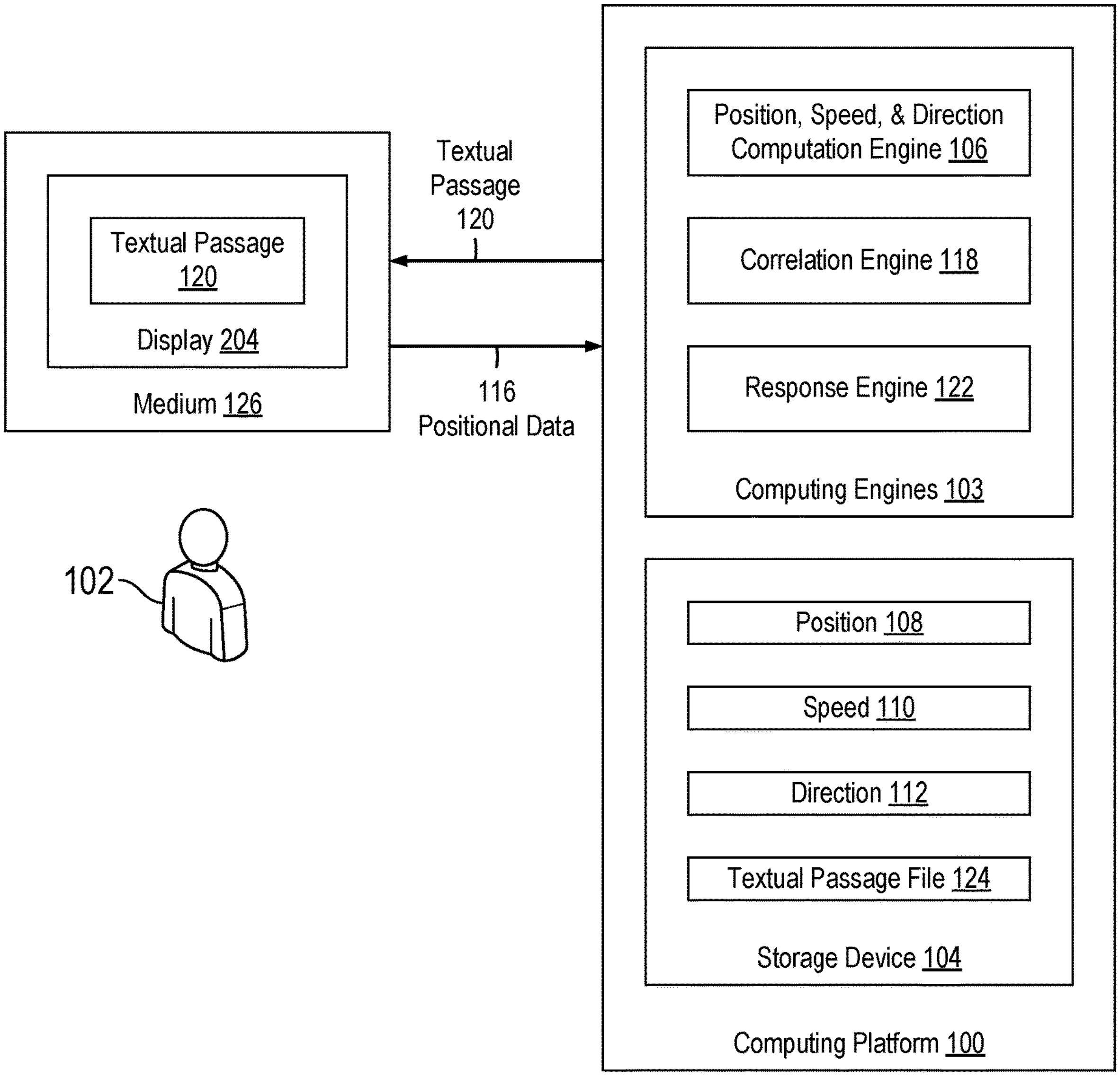
FIG. 2 is another block diagram of the computing platform, according to an embodiment.

FIG. 2 is another block diagram of computing platform 100, according to an embodiment. In the example of FIG. 2, medium 126 includes a touch-sensitive display 204. In this example, computing platform 100 may provide textual passage 120 (e.g., from a textual passage file 124 and/or from a speech synthesizer) to the touch-sensitive display, and may receive positional data 116 from the touch-sensitive display.

Figure 3:
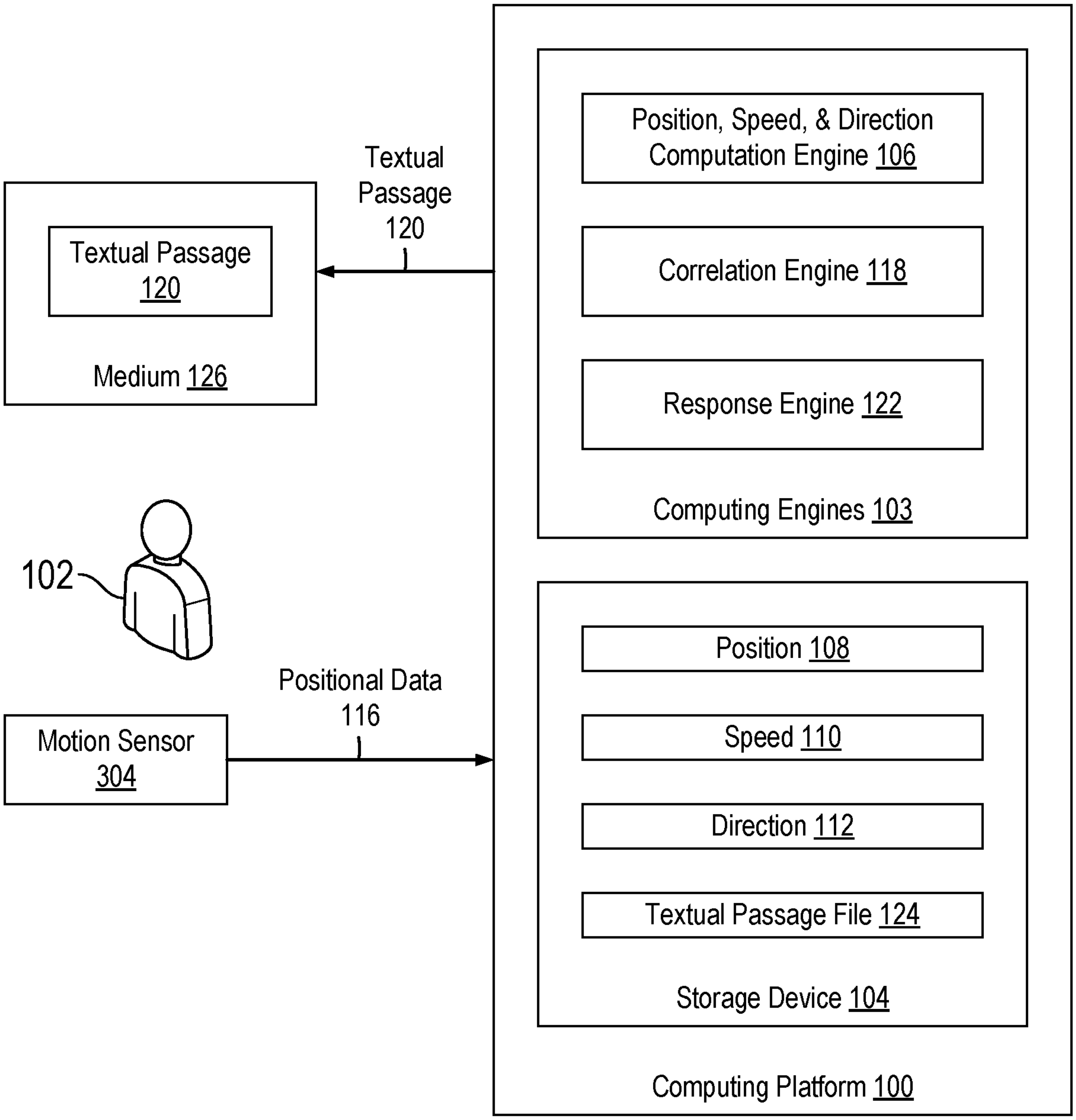
FIG. 3 is another block diagram of the computing platform, according to an embodiment.

FIG. 3 is another block diagram of computing platform 100, according to an embodiment. In the example of FIG. 3, medium 126 includes a display. The display may include a flat panel type display or a projector that projects textual passage on a display surface. A projector may include a traditional image/video projector, a virtual reality (VR) device (e.g., headset), an augmented reality (AR) device (e.g., a heads-up display), and/or combinations thereof. In this example, computing platform 100 may provide textual passage 120 (e.g., from textual passage file 124 or from a speech synthesizer) to the display, and may receive positional data 116 from a motion sensor 304. Motion sensor 304 may include, without limitation, a pointing device (e.g., a mouse or stylus), a wearable motion sensor (e.g., a hand or finger-tip wearable motion sensor), and/or other motion sensor(s).

Figure 4:
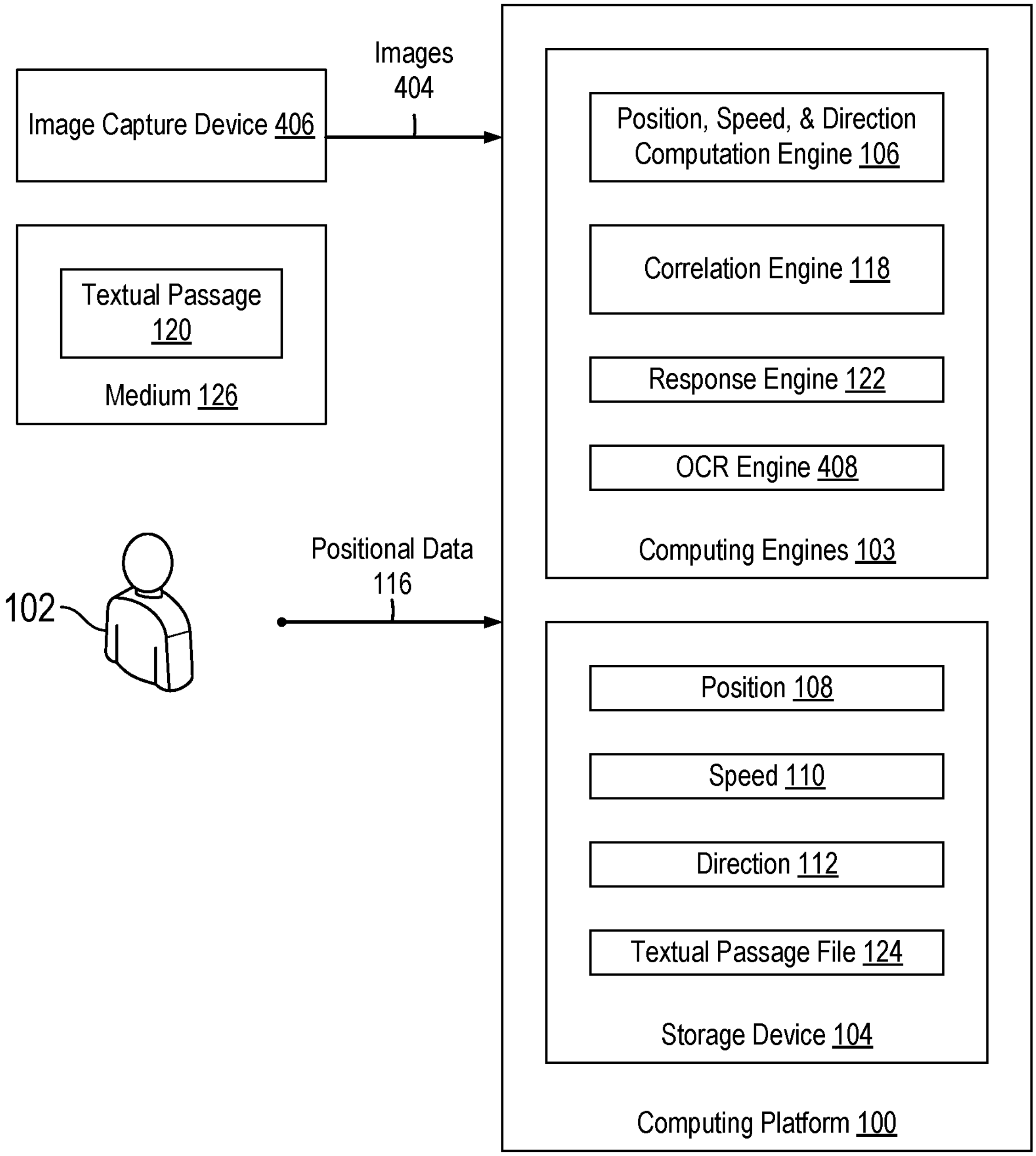
FIG. 4 is another block diagram of the computing platform, according to an embodiment.

FIG. 4 is another block diagram of computing platform 100, according to an embodiment. In the example of FIG. 4, medium 126 includes a physical medium (e.g., a printed medium, such as paper or a book). In this example, computing platform 100 may receive images 404 of textual passage 120 from an image capture device 406 (e.g., a scanner, a still frame camera, or a video camera). Further in this example, computing engines 103 may further include an optical character recognition (OCR) engine 408 that converts image 404 to textual passage file 124. Computing platform 100 may receive positional data 116 as described in one or more other examples herein.

Figure 5:
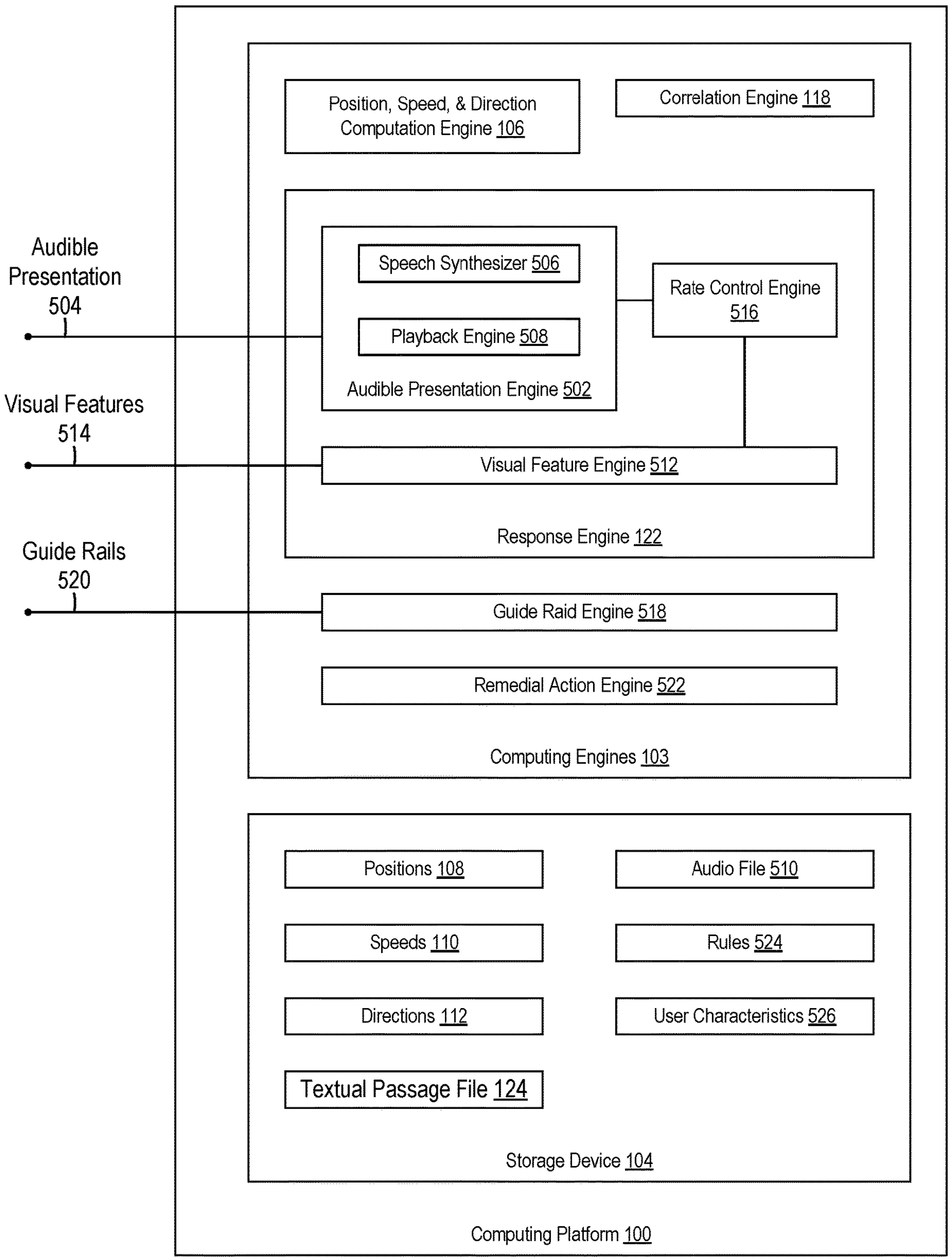
FIG. 5 is another block diagram of the computing platform, according to an embodiment.

FIG. 5 is another block diagram of computing platform 100, illustrating additional features that may be implemented alone/individually and/or in various combinations with one another and/or in various combinations with other features disclosed herein. In the example of FIG. 5, response engine 122 includes an audible presentation engine 502 that audibly presents textual passage 120, or a portion thereof, as an audible presentation 504. Audible presentation engine 502 may provide audible presentation 504 as a signal to a speaker of a user device. Audible presentation engine 502 may include a speech synthesizer 506 that dynamically generates audible presentation 504 (e.g., from textual passage file 124). Alternatively, or additionally, audible presentation engine 502 may include a playback engine 508 that provides audible presentation 504 from an audio file 510 of textual passage 120. Audible presentation engine 502 may provide audible presentation 504 at a rate that is based on speed 110 of the motion of user 102.

In the example of FIG. 5, response engine 122 further includes a visual feature engine 512 that visually emphasizes textual passage 120, or a portion thereof, with visual features 514, examples of which are provided further below with reference to FIGS. 7 through 10. Visual feature engine 512 may provide or update visual features 514 at a rate that is based on speed 110 of the motion of user 102. Computing engines 103 may further include a rate control engine 516 that controls a rate of audible presentation 504 and/or a rate of a presentation of visual features 514.

In the example of FIG. 5, computing engines 103 further includes a guide-rail engine 518 that provides textual passage 120 with swipe guide-rails (guide-rails) 520, such described further below with reference to FIGS. 11 through 13. Guide-rail engine 518 may be utilized alone and/or in combination with one or more other features disclosed herein.

Computing engines 103 may further include a remedial action engine 522 that performs one or more remedial actions based on positional data 116 and one or more rules 524, examples of which are provided further below.

Computing engines 103, or a subset thereof, may utilize user characteristics 526, examples of which are provided further below.

Figure 6:
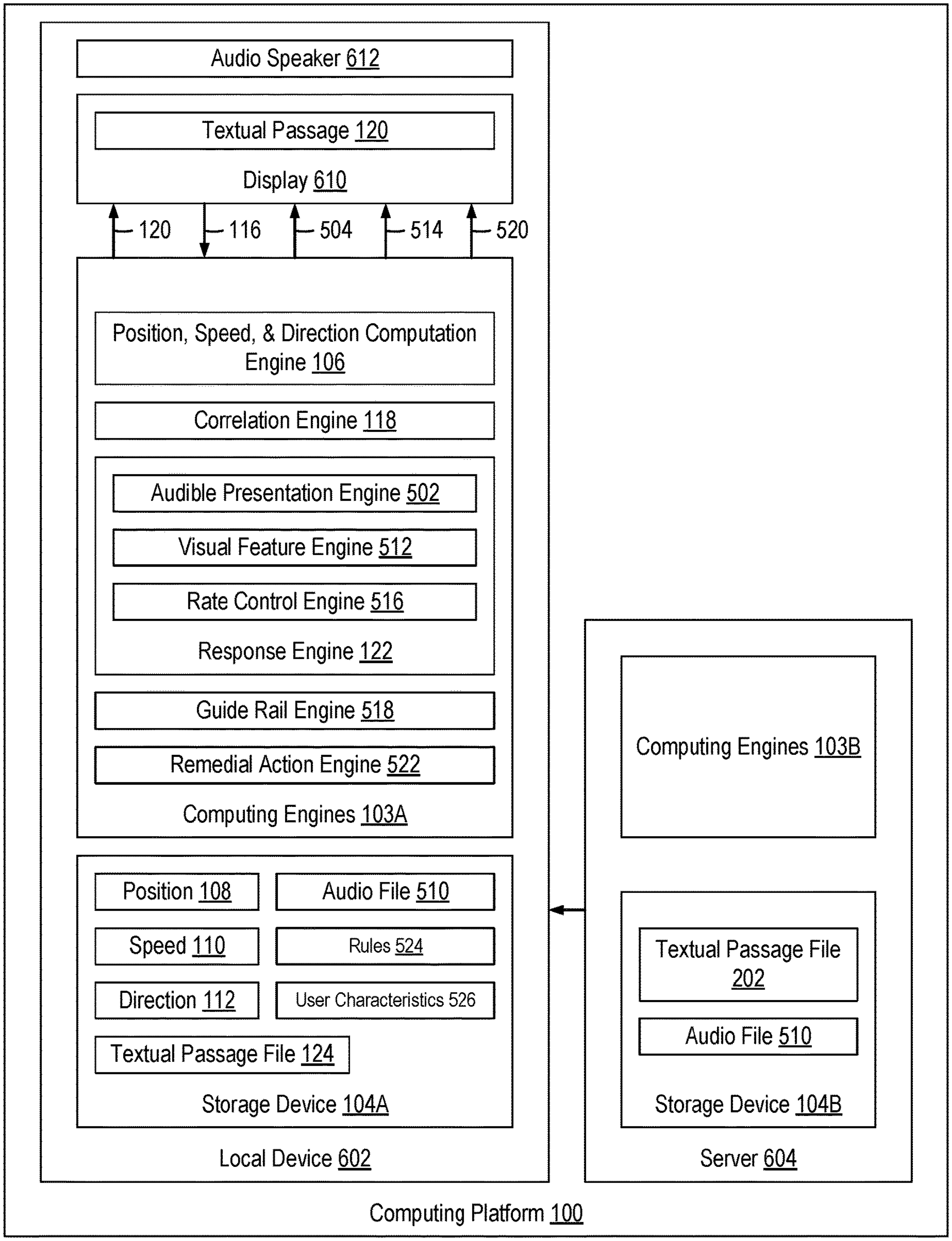
FIG. 6 is another block diagram of the computing platform, according to an embodiment.

FIG. 6 is another block diagram of computing platform 100, according to an embodiment. In the example of FIG. 6, computing platform 100 is distributed amongst a local device 602 and a server 604. Local device 602 may represent a user device (e.g., a mobile smart device, a tablet computer, a laptop computer, and desktop computer, and/or other user device). Server 604 may represent a cloud-based server, or cloud processing system. In the example of FIG. 6, local device includes computing engines 103A and storage device 104A. Server 604 includes computing engines 103B and storage device 104B. Computing engines 103B may include speech synthesizer 506 and/or one or more computing engines illustrated in computing engines 103A. Storage device 104A may store textual passage file 124, audio file 510 (if available), and metadata associated with textual passage file 124 and/or audio file 510. In an embodiment, textual passage file 124 and audio file 510 (if available), initially reside on server 604, and are subsequently downloaded to local device 602.

In FIG. 6, medium 126 of FIG. 1 is illustrated as a display 610. Display 610 may be touch-sensitive, and may provide positional data 116. Alternatively, positional data 116 may be provided by a pointer device and/or motion sensor, such as described in one or more examples herein. Local device 602 may further include an audio speaker 612.

Local device 602 may perform one or more functions, examples of which are provided below. Local device 602 may download and display textual passage 120 and associated metadata from server 604. Local device 602 may interpret swiping and tapping motions initiated by user 102. Local device 602 may calculate locations and speeds of swiping and tapping hand/finger/pointer gestures relative to textual passage 120. Local device 602 may continually or periodically compute swipe speeds with high frequency using local compute power. Local device 602 may determine which text (i.e., a sequence of characters of textual passage 120) is "in-focus" for user 102 (i.e., a sequence of characters of textual passage 120 to be read). Local device 602 may interpret user gestures and synchronize audio playback to the in-focus text. Local device 602 may determine whether user 102 is adequately attentive to textual passage 120 using a combination of heuristics for intentional swiping motions and/or other inputs (e.g., eye tracking). Local device 602 may play back relevant audio segments at continually variable speeds, while modifying the audio pitch to result in a natural speaking voice.

Local device 602 may include a tablet device that displays text alongside other visual cues (e.g., visual features 514 and/or guide-rails 520) on a touch-capable screen in such a way as to mimic a physical page of a book or physical piece of paper. The tablet device may detect and interpret swiping and tapping touch inputs, calculate the position and speed of touch inputs relative to the displayed text, and play back the relevant downloaded audio segments through audio speaker 612, with variable playback speed. The tablet device may employ eye tracking techniques (if a front camera is available) to help evaluate text attentiveness.

Local device 602 may include smart glasses that project text alongside visual cues (e.g., visual features 514 and/or guide-rails 520) onto a display surface. The smart glasses may detect and interpret swiping and tapping hand gestures in 3D-space, calculate the position and speed of hand gestures relative to the projected text and visual cues, and play back the relevant downloaded audio segments through audio speaker 612, with variable playback speed. The smart glasses may employ eye tracking techniques to help evaluate text attentiveness.

Local device 602 may include smart glasses that superimpose visual cues (e.g., visual features 514 and/or guide-rails 520) over a physical embodiment of textual passage 120 (e.g., a book). The smart glasses may detect a book in front of user 102, and superimpose visual cues (e.g., visual features 514 and/or guide-rails 520) alongside printed text of the book. The smart glasses may detect and interpret swiping and tapping hand gestures in 3D-space, calculate the position and speed of hand gestures relative to the text printed on the physical medium, and play back the relevant downloaded audio segments through audio speakers 612, with variable playback speed. The smart glasses also employ eye tracking techniques to help evaluate text attentiveness.

Local device 602 may include a smart pointer and corresponding paper printed with a unique background pattern, and printed with the foreground text and swipe guide-lines. The smart pointer may download data from server 604, optically scan the unique background pattern to determine where on the page the pointer is pointing and the velocity of the pointer's motion, and synchronize audio play back through audio speaker 612, which may be located in the smart pointer another device (the audio may be streamed to a secondary local device that contains audio speaker 612).

When presenting textual passage 120 on display 610 (e.g., a tablet display), local device 602 may use knowledge of the screen size and other device-specific settings, along with metadata provided by server 604, to optimize the presentation. Local device 602 may for example, use metadata regarding the length of a paragraph to inform font size on a displayed page of textual passage 120.

Computing platform 100 may include various combinations of features illustrated in one or more of FIGS. 1-6. Computing platform 100 may include a subset of one or more features illustrated in and/or described with respect to one or more of FIGS. 1-6.

Figure 7:
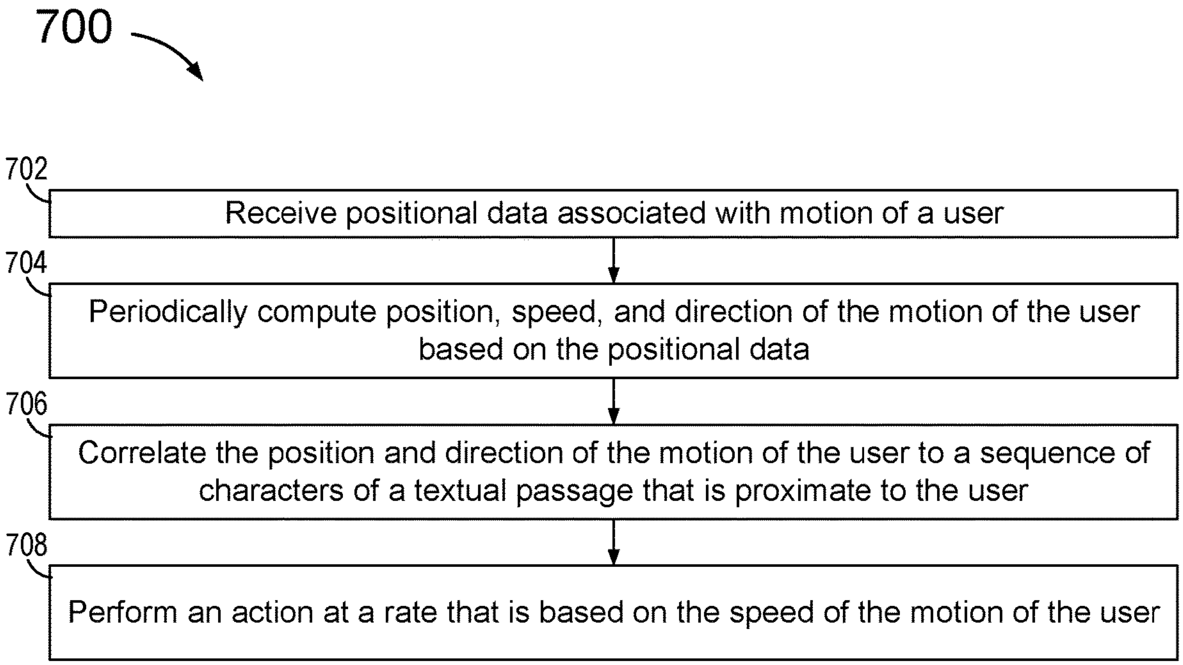
FIG. 7 is a flowchart of a method of providing a multi-sensory and interactive reading experience, according to an embodiment.

FIG. 7 is a flowchart of a method 700 of providing a multi-sensory and interactive reading experience, according to an embodiment. Method 700 is described below with reference to FIGS. 1 through 6 and 8A through 10 for illustrative purposes. Method 700 is not, however, limited to the examples of FIGS. 1 through 6 and 8A through 10.

At 702, computing platform 100 receives positional data 116 associated with motion of user 102. Computing platform 100 may receive positional data 116 as a stream of 2-dimensional position data associated with motion of user 102. Computing platform 100 may receive positional data 116 from touch-sensitive display 204 and/or motion sensor 304.

At 704, position, speed, and direction computation engine 106 periodically computes positions 108, speeds 110, and directions 112 of the motion of user 102 based on positional data 116.

At 706, correlation engine 118 attempts to correlate positions 108 and directions 112 to sequences of characters of textual passage 120. Correlation engine 118 may initiate or invoke response engine if/when positions 108, speeds 110, and/or directions 112 correlate to a sequence of characters of textual passage 120.

Figure 8A:
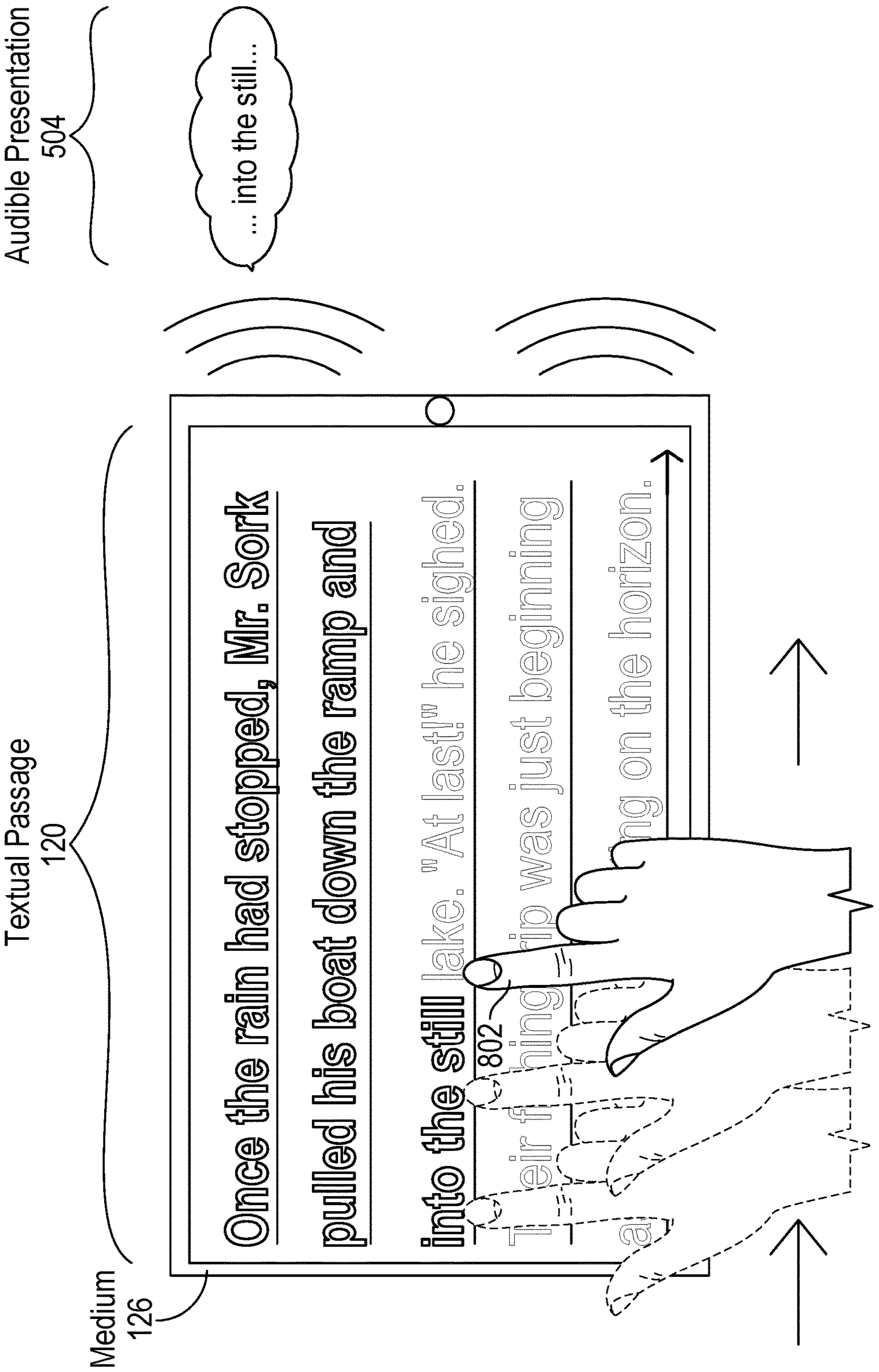
FIG. 8A is an illustration of a textual passage with visual features, according to an embodiment.

FIG. 8A is an illustration of textual passage 120 with visual features 514, according to an embodiment. In the example of FIG. 8A, as user 102 motions (e.g., drags or swipes a finger 802) in a left-to-right, line-by-line fashion through textual passage 120, correlation engine 118 correlates the motion of user 102 (i.e., positions 108, speeds 110, and/or directions 112) to sequences of characters (e.g., letters, words, and/or sentences) of textual passage 120. Correlation engine 118 may for example, correlate the motion of user 102 to the words "into the still." Correlation engine 118 may evaluate positions 108, speeds 110, and/or directions 112 in an ongoing or continuous manner (e.g., within a moving window of time).

Correlation engine 118 may evaluate positions 108, speeds 110, and/or directions 112 based on one or more thresholds and/or rules, illustrated in FIG. 5 and rules 524. Rules 524 may include, for example and without limitation, rules and/or thresholds to determine whether a user motion is appropriate or inappropriate. A threshold may relate to, for example and without limitation, display coordinate boundaries (e.g., horizontal, vertical, and/or area thresholds), and/or minimum and/or maximum permissible speeds. A rules 524 may apply different threshold values, and/or vary a threshold based on features of and/or contextual information related to textual passage 120. Examples include, without limitation, applying a lower speed threshold at punctuation marks or gaps in guide-rails 520 (described further below), setting and/or varying a threshold based on row and/or character spacing, type of textual passage (e.g., informational text, rhyme, lyrics, and/or other type), and/or contextual information related to user 102 (e.g., reading fluency). Contextual information related to user 102 may be stored as user characteristics 526.

A rule 524 may include a pattern of permissible and/or impermissible user motion. A rule 524 may include a computation. A rule 524 may specify a remedial action to be performed by remedial action engine 522 (e.g., pause or halt audible presentation 504 and/or visual features 514, provide assistance, advice, and/or a warning to user 102). A rule 524 may specify that positions 108, speeds 110, and/or directions 112 are to be discarded they do not conform to the rule.

As an example, swiping a finger below a line or row of text in an intentional, reading-appropriate way, may initiate synchronous audio playback of the text, whereas swiping a finger in a way that is not appropriate for reading may result in an error. For example, swiping below the text at a speed that is faster than appropriate for even the most fluent speaker may not result in super-speed audio playback, as that would not model the best fluent reading experience. Similarly, swiping right-to-left, if the language is a left-to-right language (such as English), may not result in audio playback.

A situation may arise in which the motion of user 102 begins or ends within a connected string of pronounceable characters (e.g., within a word) of textual passage 120. In such a situation, correlation engine 118 may include the entirety of the connected string of pronounceable characters in the sequence of characters if the motion of the user encompasses at least a pre-defined portion (e.g., a predefined percentage) of the connected string of pronounceable characters.

At 708, response engine 122 performs an action at a rate that is based on speed 110 of the motion of user 102.

As an example, audible presentation engine 502 may audibly present the sequence of characters as audible presentation 504, via audio speaker 612, at a rate that is based on speed 110 of the motion of user 102. The audible presentation of the sequence of characters may be synchronous or aligned with the motion of user 102, such that characters of the sequence of characters are audibly presented with essentially no perceptible delay to user 102. In the example of FIG. 8A, audible presentation engine 502 provides audible presentation 504 of the sequence of characters of textual passage 120 as user 102 motions (e.g., drags or swipes finger 802) through the sequence of characters. Audible presentation engine 502 may audibly present the sequence of characters substantially synchronous with the motion of user 102, such that no word is "spoken" through audio speaker 612 unless and until the word is "swiped" in a motion that mimics reading.

Alternatively, or additionally, visual feature engine 512 may provide visual features 514 to medium 126 (e.g., display 610 in FIG. 6), at a rate that is based on speed 110 of the motion of user 102. Visual feature engine 512 may for example and without limitation, emphasize or accentuate characters of the sequence characters substantially synchronous with the motion of user 102.

In the example of FIG. 8A, visual feature engine 512 emphasizes or accentuates characters (e.g., letters, words, and/or sentences) of the sequence of characters as user 102 motions (e.g., drags or swipes finger 802) through the sequence of characters. Visual feature engine 512 may emphasize or accentuate the characters substantially synchronous with the motion of user 102, such that no word is emphasizes or accentuates unless and until the word is swiped in a motion that mimics reading. In the example of FIG. 8A, visual feature engine 512 emphasizes or accentuates the characters with coloring or changes in coloring. Alternatively, or additionally, visual feature engine 512 may emphasize or accentuate the characters with font changes, background color changes, and/or other techniques that would be noticeable to user 102.

Figure 8B:
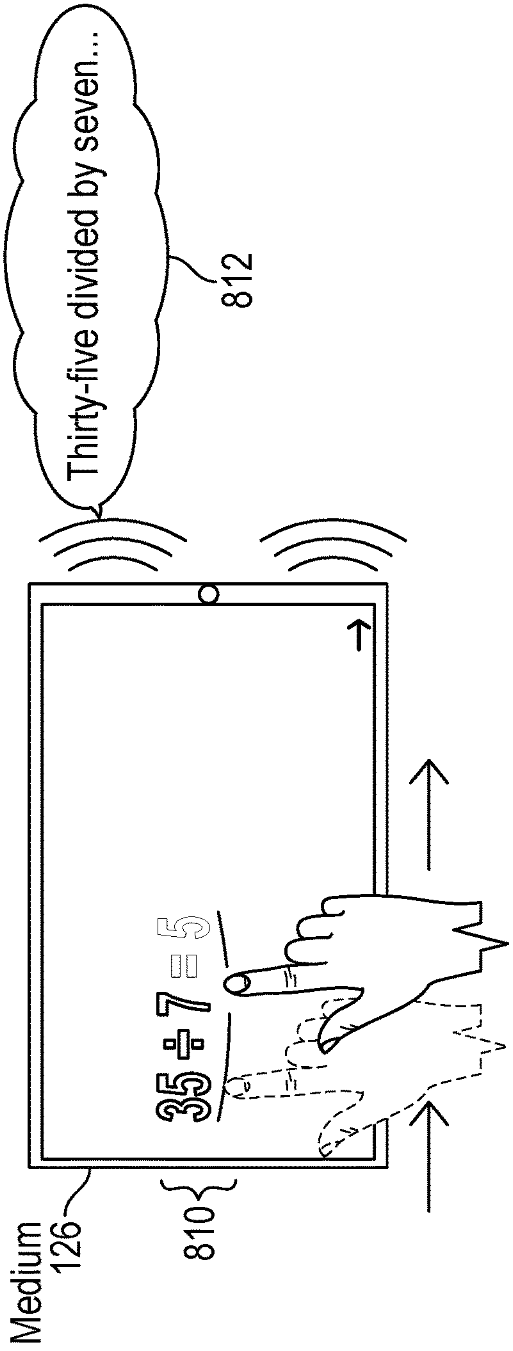
FIG. 8B is an illustration of another textual passage with visual features, according to an embodiment.
Figure 8C:
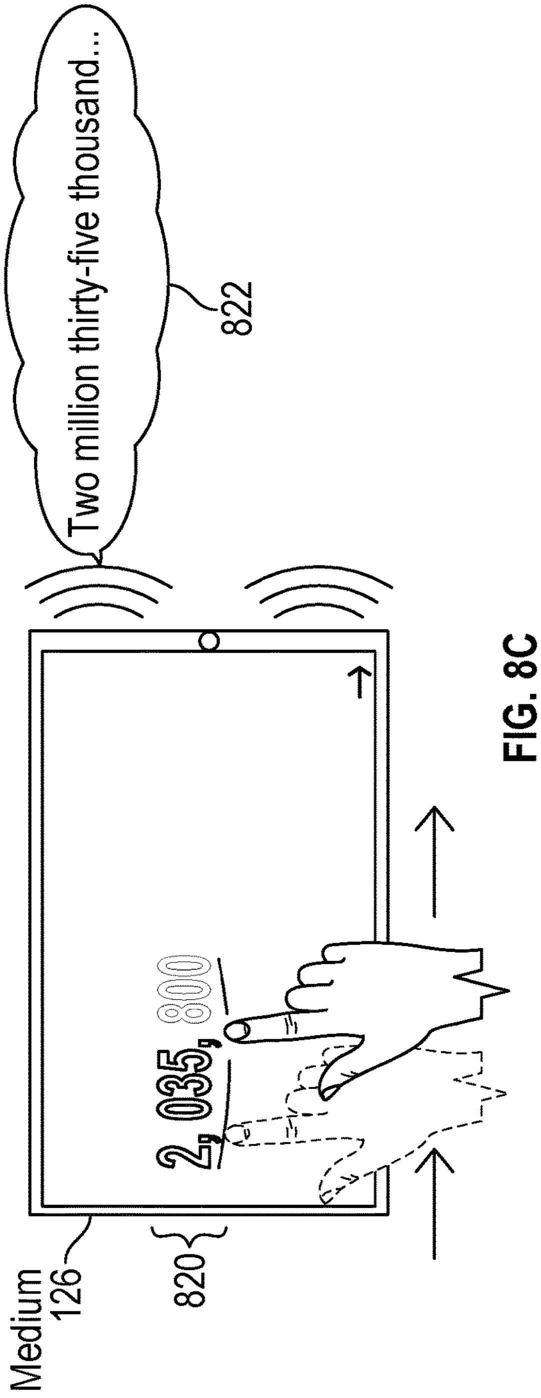
FIG. 8C is an illustration of another textual passage with visual features, according to an embodiment.

Additional examples are provided below with reference to FIGS. 8B and 8C. FIG. 8B is an illustration of a textual passage 810, according to an embodiment. In the example of FIG. 8B, textual passage 810 includes a sequence of characters, illustrated here as a mathematical equation), and audible presentation engine 502 audibly presents the sequence of characters as an audible presentation 812 as a user motions through the sequence of characters. FIG. 8B is an illustration of a textual passage 820, according to an embodiment. In the example of FIG. 8C, textual passage 820 includes a sequence of characters, illustrated here as a multi-digit numerical value), and audible presentation engine 502 audibly presents the multi-digit numerical value as a user motions through the sequence of characters.

A situation may arise in which a user 102 subsequently motions (e.g., swipes) a sequence of characters after previously swiping the sequence of characters. In such a situation, correlation engine 118 may correlate the subsequent motion of user 102 to the sequence of characters, and response engine 122 may repeat an action at a rate that is based on speed 110 of the subsequent motion of user 102. An example is provided below with reference to FIG. 9.

Figure 9:
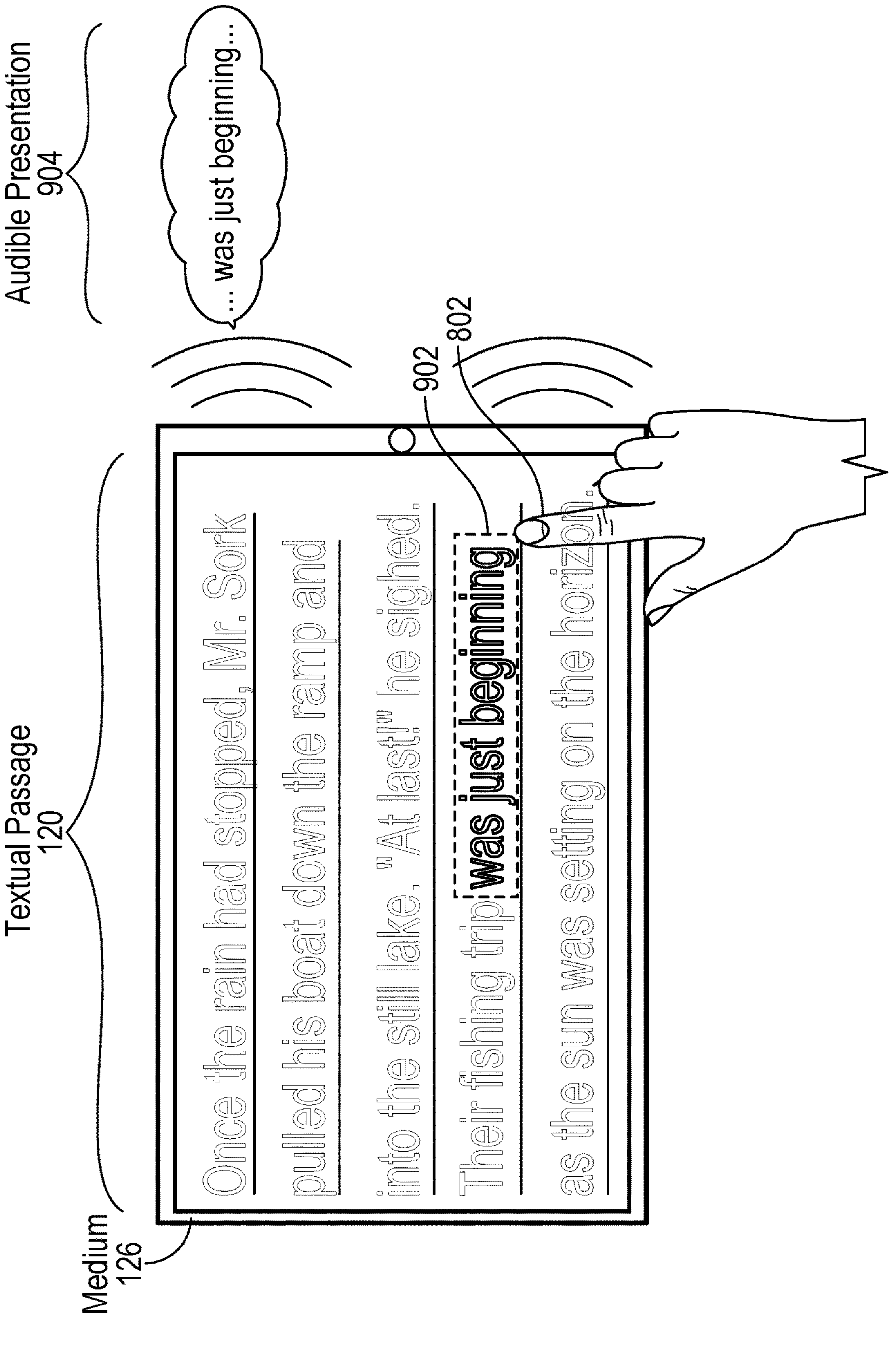
FIG. 9 is another illustration of the textual passage with visual features, according to an embodiment.

FIG. 9 is another illustration of textual passage 120 with visual features 514, according to an embodiment. In the example of FIG. 9, user 102 has motioned through textual passage 120, and subsequently motions (e.g., drags or swipes finger 802) through a sequence of characters 902 (i.e., "it was just beginning") of textual passage 120. In this example, correlation engine 118 correlates the subsequent user motion to sequence of characters 902, audible presentation engine 502 audibly presents sequence of characters 902 as an audible presentation 904, and visual feature engine 512 emphasizes or accentuates sequence of characters 902, synchronous with the subsequent motion of user 102, such that sequence of characters 902 is visually distinguishable from remaining characters/text of textual passage 120.

In an embodiment, correlation engine 118 detects a tapping motion of user 102 directed to a character or set of characters (e.g., a word) of textual passage 120, and visual feature engine 512 audibly presents the character or set of characters as an audible presentation 504. Alternatively, or additionally, visual feature engine 512 may emphasize or accentuate the character or set of characters. An example is provided below with reference to FIG. 10.

Figure 10:
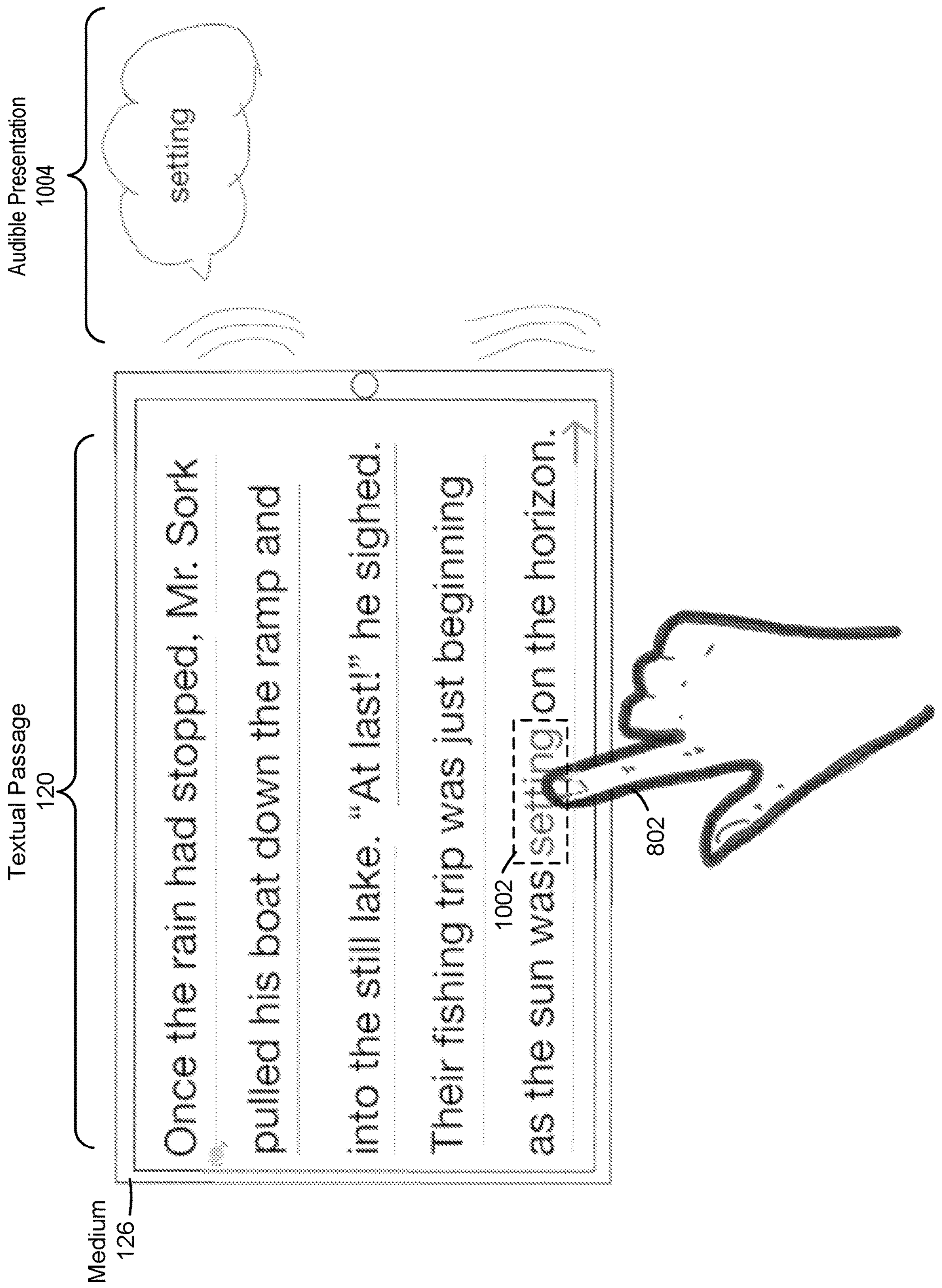
FIG. 10 is another illustration of the textual passage with visual features, according to an embodiment.

FIG. 10 is another illustration of textual passage 120, according to an embodiment. In the example of FIG. 10, user 102 taps the word "setting" 1002. In this example, correlation engine 118 correlates a tapping motion of user 102 to the word "setting" 1002," audible presentation engine 502 audibly presents the word "setting" as an audible presentation 1004, and visual feature engine 512 emphasizes or accentuates word "setting" 1002 within textual passage 120.

Correlation engine 118 may detect a tapping motion based on positions 108, speeds 110, directions 112, and/or a rule 524. Correlation engine 118 may detect a tapping motion if, for example and without limitation, a threshold number of successive positions 108 are within a threshold distance of one another or within a threshold distance of a character or set of characters of textual passage 120.

In an embodiment, correlation engine 118 correlates an extended touch motion of user 102 to a character or set of characters of textual passage 120, and response engine 122 performs an action with respect to the character or set of characters. For example and without limitation, where the character or set of characters represent a word, response engine 122 may provide a definition of the word. As another example, visual feature engine 512 may emphasize or accentuate the word in a way that differs from the emphasis or accentuation applied to for swiping motions and tapping motions.

In an embodiment, rate control engine 516 manages a rate of audible presentation 504 (i.e., a rate at which audible presentation engine 502 audibly present or pronounces the sequence of characters), and/or a rate at which visual features 514 are presented/applied to the sequence of characters of textual passage 120. Rate control engine 516 may alter the rate of audible presentation 504 and/or the rate of visual features 514 to maintain alignment or synchronization between current positions 108 of user 102 and audible presentation 504 and/or visual features 514. Rate control engine 516 may alter the rate of audible presentation 504 and/or the rate of visual features 514 based on a change in speed 110 of the motion of user 102 and/or other factors (e.g., to address delays and/or other effects inherent in circuitry and/or communication paths of computing platform 100).

As an example, and without limitation, rate control engine 516 may periodically sample audible presentation 504 (e.g., to determine a rate of audible presentation 504). A sample may capture, represent, or otherwise indicate a position or location within the sequence of characters that is currently represented by audible presentation 504 (i.e., currently being presented to audio speaker 612). Rate control engine 516 may further determine a difference between a sample (e.g., a position or location within the sequence of characters that is currently represented by audible presentation 504) and a current position 108 of user 102 (relative to textual passage 120), and may adjust the rate of audible presentation 504 to reduce the difference. Rate control engine 516 may filter differences over time (e.g., using an integration, averaging, and/or other filtering method), and may control the rate of audible presentation 504 based on the filtered differences. Rate control engine 516 may control a rate of visual features 514 based on samples of visual features 514 in a similar fashion.

Rate control engine 516 may further alter a pitch of audible presentation 504 based on a change in speed 110 and/or a change in the rate of audible presentation 504. Rate control engine 516 may alter the pitch of audible presentation 504 to counter (e.g., to precisely counter) changes in the rate of audible presentation 504. Rate control engine 516 may alter the pitch of audible presentation 504 to preserve an original pitch of audible presentation 504 and/or to provide/maintain a pitch associated with a fluent reader.

Figure 11:
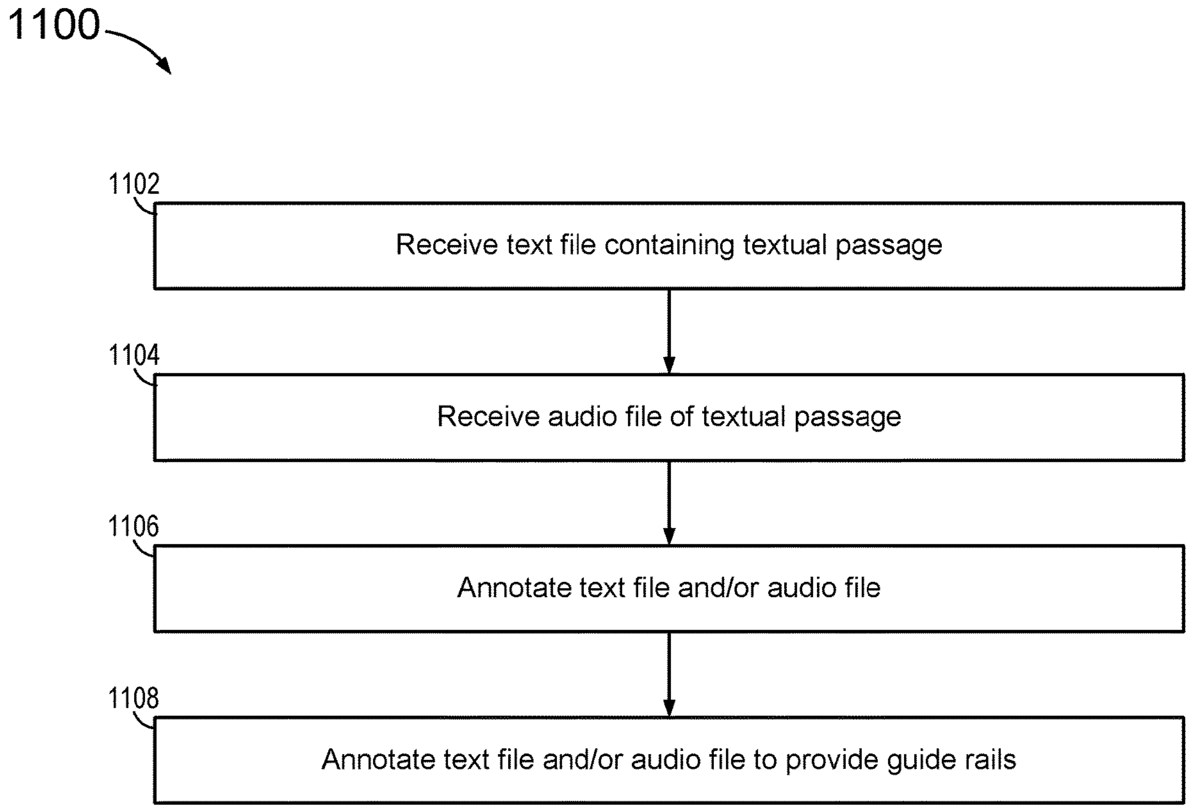
FIG. 11 is a flowchart of a method of preparing a textual passage and/or an audio file for presentation, according to an embodiment.

FIG. 11 is a flowchart of a method 1100 of preparing textual passage 120 and/or audio file 510 for presentation, according to an embodiment. Method 1100 is described below with reference to FIGS. 1-6 and FIGS. 12-15, for illustrative purposes. Method 1100 is not, however, limited to the examples of FIGS. 1-6 or the examples of FIGS. 12-15.

At 1102, textual passage 120 is received by computing platform 100 (e.g., at server 604) as textual passage file 124. Textual passage file 124 may be a relatively simple text file (e.g., coded in accordance with an American Standard Code for Information Interchange (ASCII) standard), and/or may include graphics, mathematical expressions, musical notations/scores, and/or other features. Server 604 may receive textual passage file 124 from a user. Alternatively, image capture device 406 may scan or capture images 404 from printed material (e.g., pages of a book), and OCR engine 408 may convert images 404 to textual passage file 124. Where images 404 contain illustrations and text superimposed over the illustrations, server 604 may parse the text from the illustrations, and may store the parsed text in textual passage file 124 in association with images of the corresponding illustrations. Server 604 may associate the parsed text with the corresponding illustrations via metadata (e.g., dialog sentence X belongs with illustration Y, or word Z is illustrated with picture A, or chapter 3 goes with graphic 9).

At 1104, server 604 receives audio file 510. Audio file 510 may include an audio recording of a human-narration of textual passage 120, and/or synthesized (i.e., computer-generated) narration of textual passage 120 (e.g., generated by speech synthesizer 506). The audio recording may emphasize good fluency, that is, the narration may have good prosody and accuracy, and a moderate speed. A fluent reader with full command of the language, with access to a microphone and recording device, may upload the audio recording and textual passage file and corresponding text to the cloud processing system, with no special training required. Though, a fluent reader with a highly expressive voice, excellent articulation, and standard accent is most likely to produce the best results, as in a professional voice actor.

At 1106, a user and/or a computing engine of server 604 may annotate textual passage file 124 and/or audio file 510.

Server 604 may include one or more language-based models and a natural language processing (NLP) engine that analyze textual passage file 124 and/or audio file 510. Server 604 may determine start/stop timestamps of each individual word within audio file 510, using textual passage file 124 as a processing aid for accuracy. Server 604 may also calculate timestamps of pauses in the narration of audio file 510, and may store the timestamps as metadata of audio file 510. Server 604 may use a combination of text analysis and audio analysis (for example, the timestamps of pauses), determine the start/stop timestamps of meaningful phrases within sentences of textual passage 120. The meaningful phrases may be useful to demarcate locations or positions within textual passage file 124 and/or audio file 510 for guide-rails 520.

Server 604 may include a computing engine that permits human annotators to verify auto-generated metadata of textual passage file 124 and/or audio file 510, and/or add or remove metadata of textual passage file 124 and/or audio file 510. Human annotation may be useful to improve accuracy and/or to improve a user experience, such as to address language subtleties. Human annotators may also annotate guide-rails 520, such as to adjust guide-rail phrase demarcations based on a level of reading fluency of user 102. Guide-rails 520 are described below with respect to 1108.

Server 604 may analyze textual passage file 124 and/or audio file 510 to determine relevant emotions at play. For example, if in some dialog, a character in a book exclaims, "wow," that word or larger phrase may be tagged as/excited/ and/or/sarcastic/, depending on a context of the dialog, such that the word pay be audibly presented with appropriate tone. Again, human annotators may be permitted to verify, modify, and/or add to emotions determined computing platform 100.

Server 604 may generate metadata that definitively marks the beginnings and ends of sentences, even when sentences may contain many "periods." Such sentences might contain dialog with punctuation inside quotations. Or such sentences might contain abbreviations ("Mrs." or "Mr." or "M.V.P."), or ellipses.

Server 604 may obtain definitions/means of words of textual passage 120 from one or more sources. Server 604 may use text analysis and knowledge of the relevant language to identify and store the correct meaning when a word has multiple definitions/meanings. Server 604 may for example, distinguish between multiple definitions of the word "tears" based on context (e.g., where "tears" may refer to tear drops from an eye or ripping a sheet of paper).

Server 604 may permit human annotation and human verification across multiple types of metadata, such as metadata types described above, human annotation and human verification may be particularly useful in the parsing of sentences into meaningful phrases (e.g., for guide-rails 520, described further below).

Where audio file 510 contains audio generated by speech synthesizer 506, human annotation of audio file 510 may be particularly useful, in that human-generated annotation metadata may significantly improve audio generated by speech synthesizer 506. For example, human-generated metadata describing the emotion of a word can be used (e.g., by playback engine 508) to provide a sarcastic tone to the word "wow" generated by speech synthesizer 506, thereby creating a better replica of an emotive fluent speaker. In addition, human-generated annotations may permit playback engine 508 to provide unique and compelling "voices" for different characters to enhance user engagement, similar to how a professional voice actor would vary their pitch when reading a children's novel aloud.

Server 604 may store all ingested and produced data (e.g., annotations) in such a way that it may be downloaded to local device 602 for use by playback engine 508 and/or other engines of local device 602.

At 1106, guide-rail engine 518 and/or a user may further annotate textual passage file 124 and/or audio file 510 to provide guide-rails 520 that visually demarcate segments of textual passage 120.

Guide-rails 520 may serve as scaffolding to aid a developing reader to "chunk" a sentence into smaller, meaningful phrases. Breaking apart longer sentences into meaningful phrases may be particularly helpful for those whose working memory is limited, so that any cognitive resources available after decoding can be best utilized for comprehension. The scaffolding of the guide-rails can be scaled down, little by little, as a reader becomes more fluent. For example, the chunks of phrases within a sentence can become longer and more complex, as a developing reader becomes more fluent, until ultimately one guide-rail may be the same length as the sentence itself, and may no longer be required.

Guide-rails 520 may be defined based on, for example and without limitation, punctuation of textual passage 120, metadata associated with audio file 510, audible features of audio file 510 (e.g., pauses, sighs, and/or other expressive audible features), and/or computer-based modeling of a language of textual passage 120 and/or audio file 510. Guide-rails 520 may be defined based in part on user reading fluency, which may be user-selectable (e.g., user-selectable reading skill levels) and/or which may be determined by guide-rail engine 518 based on user characteristics 526 indicative of a user reading fluency. Guide-rails may be defined as metadata associated with textual passage file 124 (for presentation when textual passage 120 is presented at display 610) and/or audio file 510. Example guide rails are described below with reference to FIGS. 12 and 13.

Figure 12:
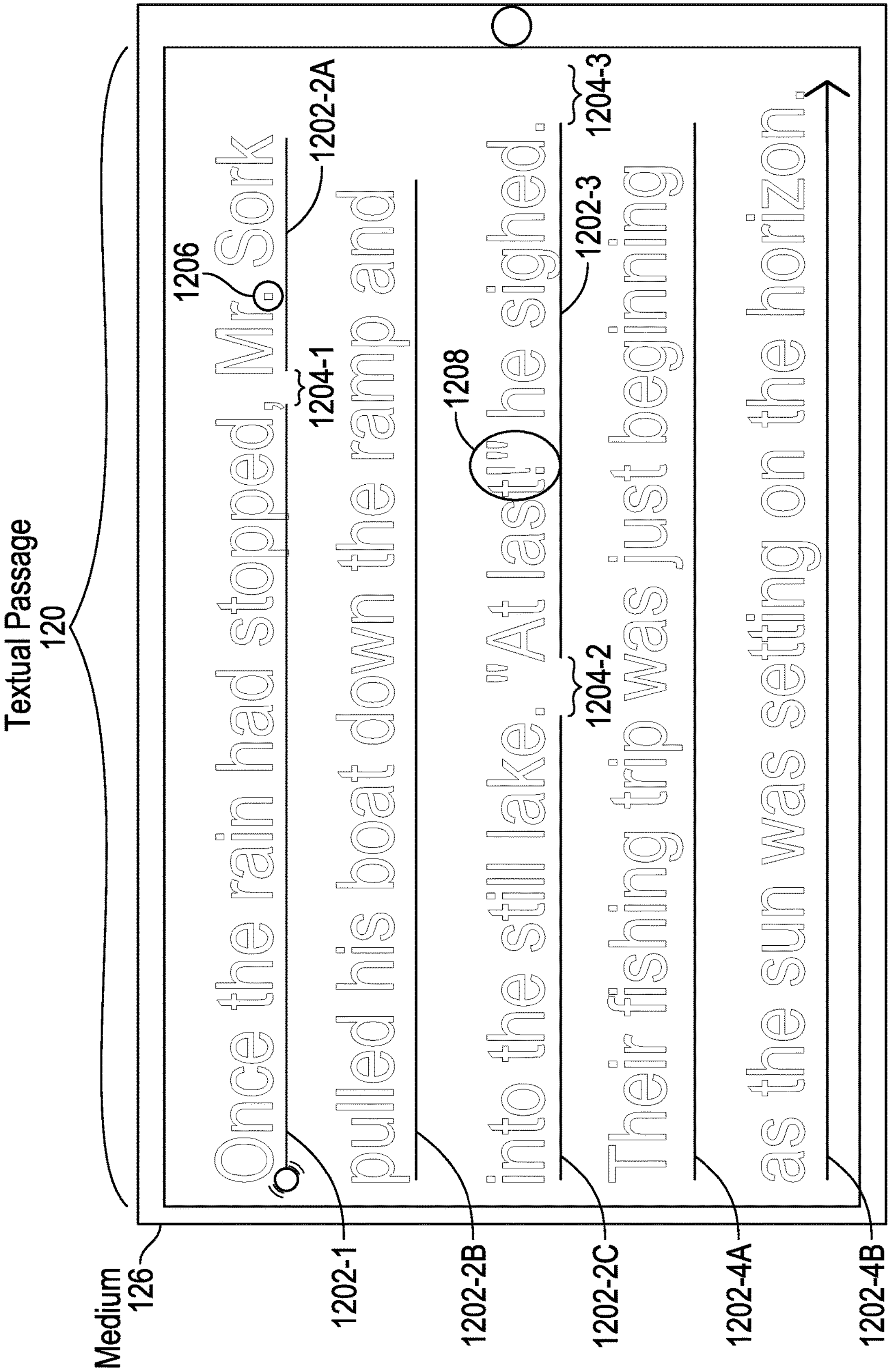
FIG. 12 is an illustration of a textual passage with guide-rails, according to an embodiment.

FIG. 12 is an illustration of textual passage 120 with guide-rails, according to an embodiment. In the example of FIG. 12, textual passage 120 is presented on display 610 to mimic a physical/printed page. In FIG. 12, the guide-rails include swipe lines 1202 and gaps 1204, which may serve as subtle visual indicators that guide a user to fluently read. In the example of FIG. 12, swipe lines 1202 include a first swipe line 1202-1, a second swipe line 1202-2 (1202-2A, 1202-2B, and 1202-2C), a third swipe line 1202-3, and a fourth swipe line 1202-4 (1202-4A and 1202-4B). Swipe lines 1202-1 and 1202-2 are separated by a gap 1204-1. Swipe lines 1202-2 and 1202-3 are separated by a gap 1204-2. Swipe lines 1202-3 and 1202-4 are separated by a gap 1204-3.

Swipe lines 1202 and gaps 1204 may be useful to indicate where/how a user is to point and swipe their finger, such as to initiate and/or control audible presentation 504. A swipe line may correspond to a sequence of pronounceable characters that a user should read without pause or interruption. A gap between swipe lines indicates that a reader is to pause. Gaps may correspond to commas, end-of-sentence punctuation marks, and/or other punctuation marks. Gaps are generally not positioned (i.e., may be omitted) at certain punctuation marks, such as punctuation marks for abbreviated words. For example, in FIG. 12, there is no gap at a period 1206 for the abbreviation of "Mr." nor is there a gap at an exclamation mark 1208, since exclamation mark 1208 does not correspond to the end of a sentence.

In the example of FIG. 12, swipe lines 1202 are positioned slightly below the corresponding text. A user may motion (e.g., drag or swipe a finger or pointing device) along a swipe mark (i.e., in a direction based on a language/convention of textual passage 120), at a relative uniform reading speed, and may pause the motion at gaps 1204. Where a swipe mark extends over multiple lines or rows of textual passage 120, computing platform 100 may ignore a brief gap in user motion as the user re-positions their finger or pointing from one line/row to the next line/row.

Figure 13:
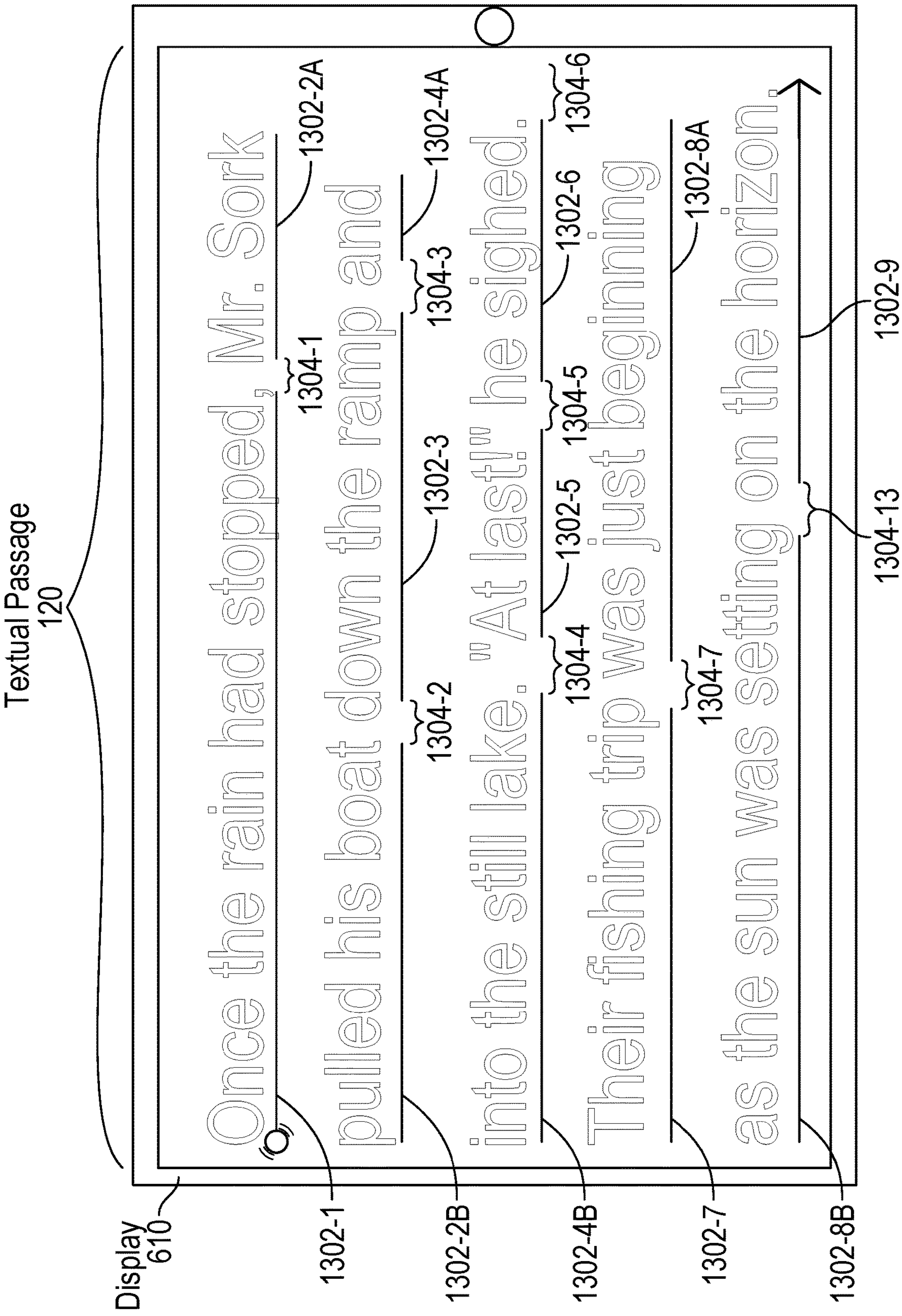
FIG. 13 is another illustration of the textual passage with guide-rails, according to an embodiment.

FIG. 13 is another illustration of textual passage 120 with guide-rails, according to an embodiment. In the example of FIG. 13, textual passage 120 is illustrated with the same text as in FIG. 12, but with swipe lines 1302 that are shorter than swipe lines 1202 of FIG. 12. Shorter swipe lines effectively parse textual passage 120 into smaller yet still meaningful phrases. Shorter swipe lines may be appropriate for a reader who may need more assistance/guidance. Swipe lines 1302 include swipe lines 1302-1, 1302-2 (1302-2A and 1302-2B), 1302-3, 1302-4 (1302-4A and 1302-4B), 1302-5, 1302-6, 1302-7, 1302-8 (1302-8A and 1302-8B), and 1302-9, separated by respective gaps 1304-1 through 1304-9.

Guide-rails 520 are not limited to the examples of FIGS. 12 and 13.

Guide-rail engine 518 may utilize regional punctuation conventions.

If guide-rails are not employed (e.g., disabled for a user who is proficient in chunking sentences unaided), computing platform 100 may nevertheless, help ensure a fluent reading experience through a series of strict requirements that take into account context, and language-specific computer-based language models of the language being used.

Figure 14:
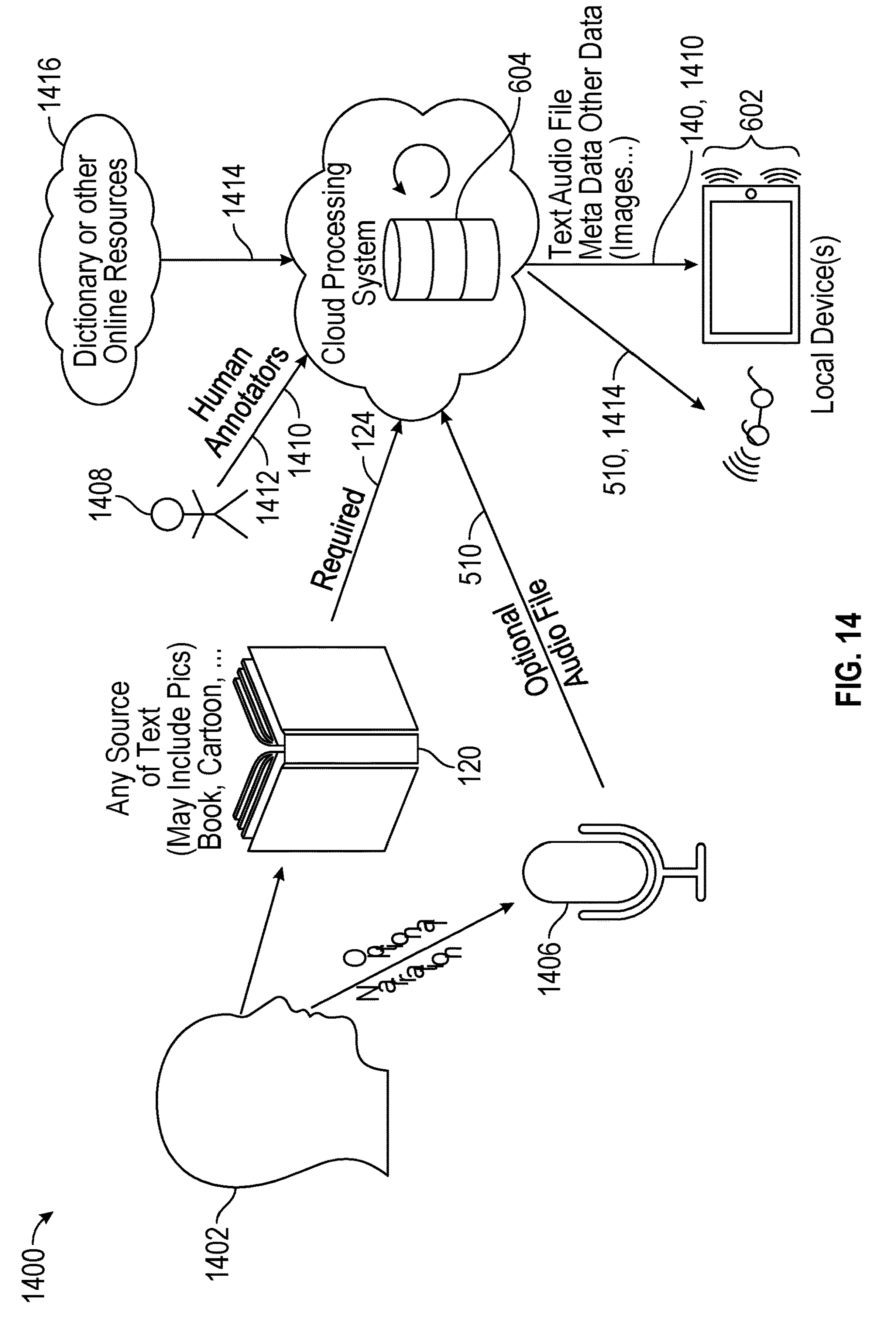
FIG. 14 is an illustration of an annotation environment, according to an embodiment.

FIG. 14 is an illustration of an annotation environment 1400, according to an embodiment. In the example of FIG. 14, a human reader 1402 narrates textual passage 120 through a microphone 1406 to provide audio file 510 to server 604. Textual passage 120 is provided to server 604 as textual passage file 124. A human annotator 1408 provides annotations 1410 related to textual passage 120 and annotations 1412 related to audio file 510 to server 604. Server 604 may supplement annotations 1410 and/or 1412 with definitions 1414 obtained from sources 1416. Server 604 provides textual passage 120, audio file 510, and corresponding annotations 1410 and 1412 (e.g., as metadata) to local device 602. As described further above, speech synthesizer 506 (FIG. 5) may narrate textual passage 120.

Figure 15:
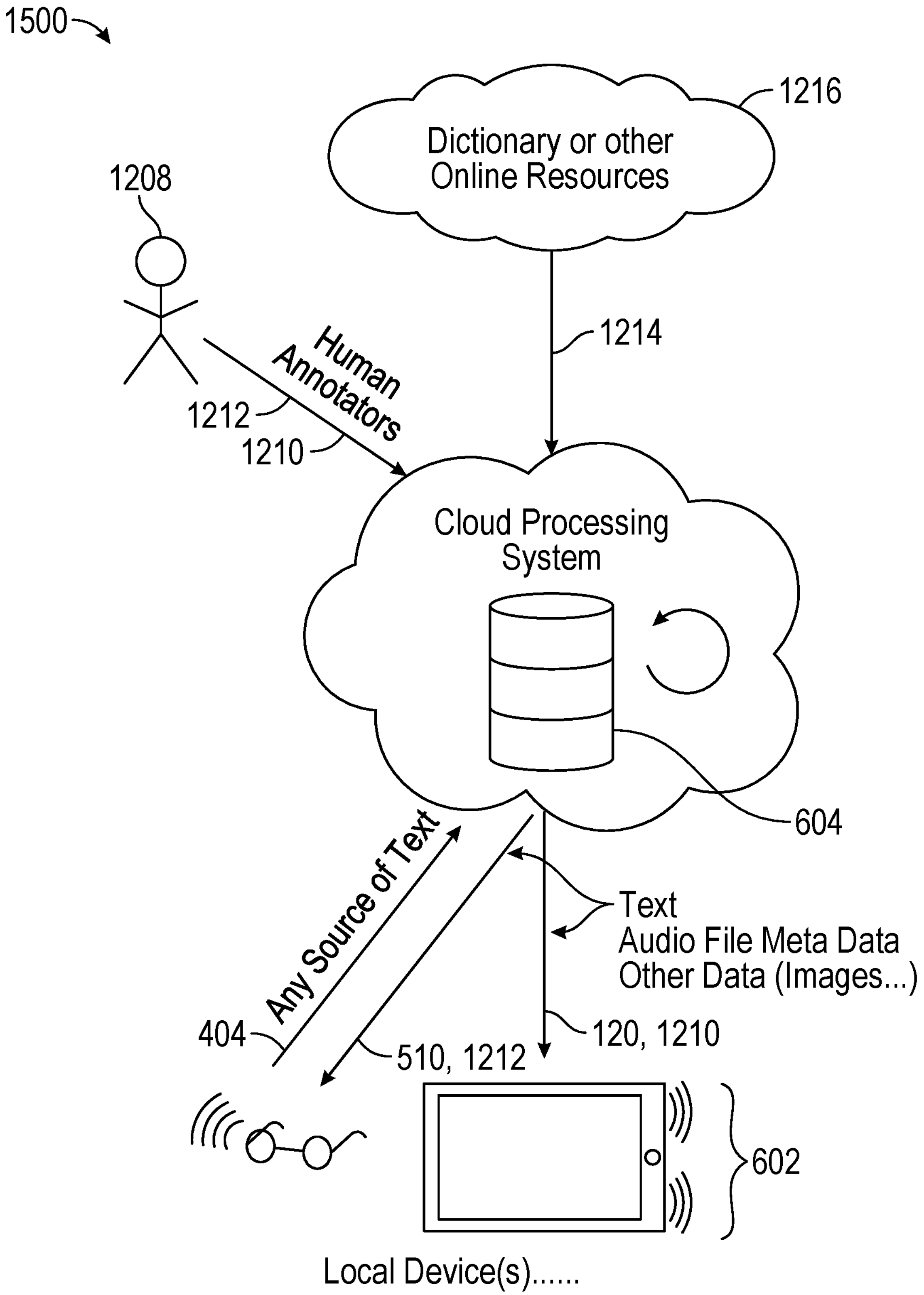
FIG. 15 is an illustration of another annotation environment, according to an embodiment.

FIG. 15 is an illustration of an annotation environment 1500, according to an embodiment. Annotation environment 1500 is similar to annotation environment 1400. In annotation environment 1500, local device 602 (or another local device) captures and provides images 404 of textual passage 120 to server 604. In this example, local device 602 may include smart glasses that capture images upload sources of text in its field of view to the cloud processing system, and subsequently receive data and metadata from the cloud system in order to proceed with the reading experience locally.

In an embodiment, computing platform 100 determines characteristics of textual passage 120, and annotates textual passage file 124 and/or audio file 510 based on the characteristics. The characteristics may include one or more of context, phrases, emotions associated with the phrases (e.g., exclamation/excitement, question, sarcasm, and/or other emotions), polysemous and/or un-decodable words (collectively referred to herein as polysemous words), and/or context-based meanings of the polysemous/un-decodable words. Computing platform 100 may annotate textual passage file 124 to provide guide rails based on the characteristics. Computing platform 100 may annotate audio file 510 to provide pauses corresponding to gaps in the guide rails and/or to provide intonations that convey emotions (e.g., exclamation/excitement, question, and/or sarcasm) based on the characteristics.

Figure 16:
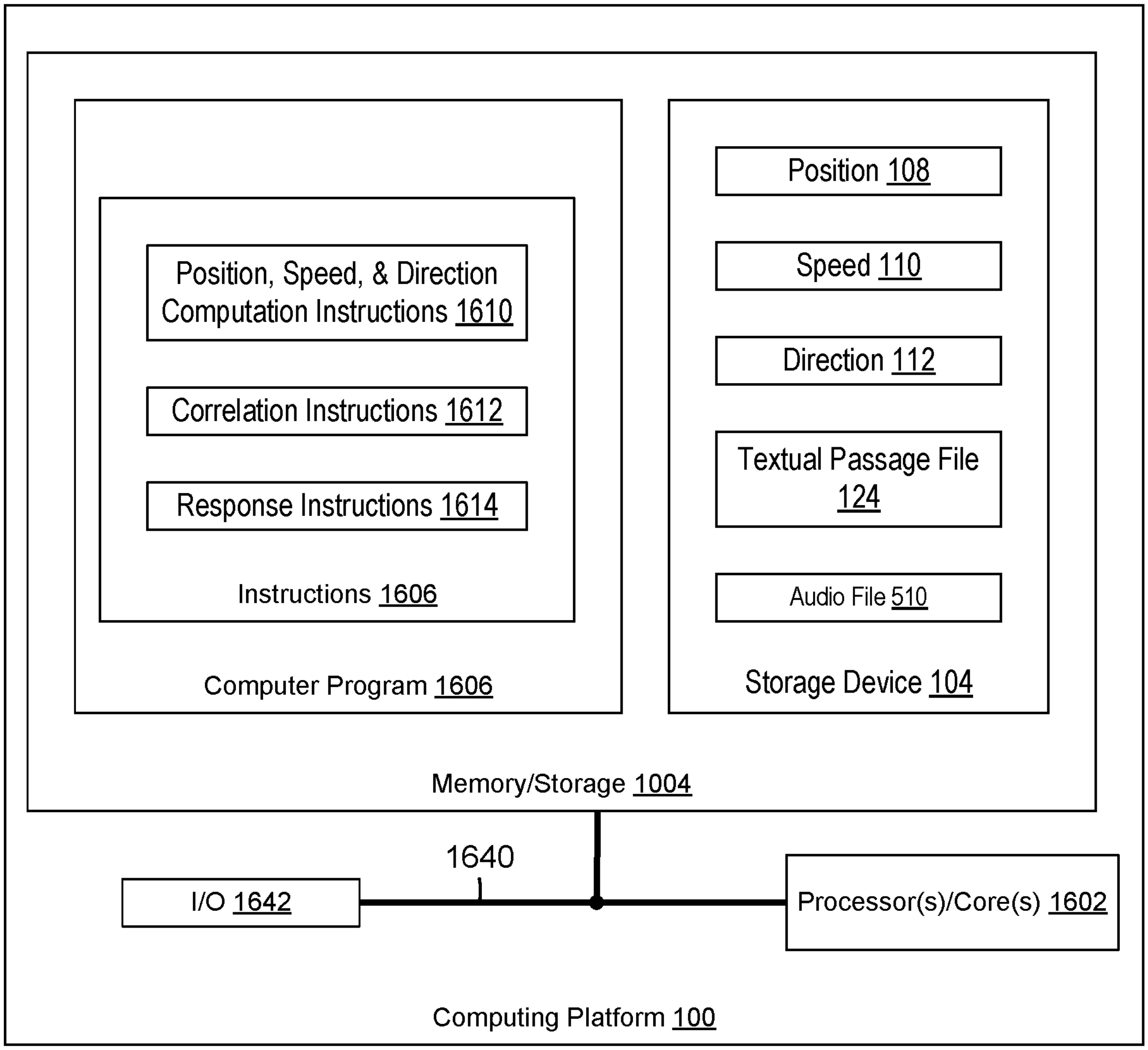
FIG. 16 is another block diagram of the computing platform, according to an embodiment.

FIG. 16 is another block diagram of computing platform 100, according to an embodiment. In the example of FIG. 16, computing platform 100 includes one or more instruction processors, illustrated here as a processor 1602, to execute instructions of a computer program 1606 encoded storage device 104 (i.e., a non-transitory computer-readable medium). Storage device 104 further includes data 1608, which may be used by processor 1602 during execution of computer program 1606, and/or generated by processor 1602 while executing of computer program 1606.

In the example of FIG. 16, computer program 1606 includes position, speed, and direction computation instructions 1610 that cause processor 1602 to compute positions 108, speeds, 110, and directions 112 based on positional data 116, such as described in one or more examples herein.

Computer program 1606 further includes correlation instructions 1612 that cause processor 1602 to correlate positions 108 and directions 112 to sequences of pronounceable characters of textual passage 120, such as described in one or more examples herein.

Computer program 1606 further includes response instructions 1614 that cause processor 1602 to perform one or more functions at rates that are based on speeds 110, such as described in one or more examples herein.

Computing platform 100 further include communications infrastructure 1640 to communicate amongst devices and/or resources of computer system 1600.

Computing platform 100 further includes one or more input/output (I/O) devices and/or controllers 1642 that interface with one or more other devices and/or systems.

Further to the examples above, computing platform 100 may perform one or more features described below.

Where a source of textual passage 120 includes illustrations, the Illustrations may be separated from the text, but situated proximate (in space and/or in time) to appropriate portions of textual passage 120. For example, if a particular picture corresponds to paragraph 3 of the textual passage 120, the picture may be incorporated into the experience (i.e., presented on display 610) soon after paragraph 3 is displayed. Separating images from text may help to ensure attentiveness to the text. The images may still be included in the overall experience, separated from the text, since the images may be an important and enjoyable aspect of the text (e.g. children's book).

Guide-rails 520 may be incorporated alongside the text and displayed to the user, indicating to a user that they are to swipe a finger directly below the text to begin the reading experience. Guide-rails 520 may subtly reinforce to the user when a pause should be taken, by breaking the swipe line, with the goal of ensuring that the user appropriately pauses at the end of a sentence, as is done when reading fluently. Guide-rails 520 may make use of metadata generated by server 604 and/or human annotators.

Local device 602 may detect and interpret a user's touch and may continuously or periodically calculate swipe speed of the user's finger or pointing device. The swipe speed will be used to inform the audio playback speed of the audio file in such a way that ensures the audio playback will be synchronized word-for-word with the swiping motion. No audio playback will occur if a user swipes in such a way that is not both intentional and reading appropriate. For example, swiping right-to-left rather than left-to-right (if the language is a left-to-right language, as in English), will result in an error and no audio playback will occur. Swiping must occur directly below the text within some margin of error to ensure that a user is continuously focusing their attention on the display screen. (Accurate, precise, intentional motion of the "reader" finger is considered to be a good proxy for text attentiveness.) In the case where eye tracking technology is available and can be employed as an additional indicator of text attentiveness, a lack of attentiveness to the text would also result in a stop of audio playback.

Computing platform 100 may vary audio playback speed. Variable speed audio playback may be limited to speeds that are appropriate for a fluent reading, not too fast and not too slow. If the user swipes at disallowed speeds, an error may occur. Special care will be taken to ensure that appropriate pauses are heard at the ends of sentences, as is required in fluent, natural language.

When words are swiped and the audio is synchronously played aloud, that word receives a persistent, synchronous WVT that shows it has been read. For example, the word may be highlighted. This serves to further call attention to the display screen and keep the user engaged. It also serves as a visual tracker showing where the reader is in a particular passage, so that a user can easily determine which line to proceed to at the end of a line break. Finally, it acts as a motivator to show how much progress has been made on a page, and how much more there is to go before all the text is "lit up" with the WVT, and the reader is ready to proceed to the next page, which may be an illustration or additional text.

The interactive touch input shall be highly flexible to allow the user to explore the text autonomously and at will. For example, a user may return to a phrase within a sentence to re-read it as many times as desired. Each time a word is read, it may receive a subsequently extreme WVT, for example, highlighting in brighter and brighter shades of orange, as is shown in FIG. 6.

A user may also explore the text in a "tap" mode, different but analogous to a "swipe" mode. In the "tap" mode, a user touches *on* (but not under) a specific word to hear that one word being read at a nominal playback speed. (FIG. 7) A visual, (but ephemeral) synchronous WVT may also be incorporated into such a "tap" mode. In "tap" mode, a user may gain access to appropriate word definitions, as previously determined by the cloud processing system. Note that no swipe guide-rails are employed while the user is exploring the text in tap mode, though they may still be displayed.

Computing platform 100 may reward user 102 for reading effort and attentiveness (as in a trophy awarded for correct swipe completion across an entire book).

Computing platform 100 may check for reading comprehension (such as requiring user 102 to tap the word that describes the color of a character's hat, which may be described in the displayed text).

Computing platform 100 may check and reinforce word recognition (such as requiring user 102 to tap the word "does" in a sentence displayed in the text).

Computing platform 100 may record an emerging reader's progress, such as operating in a silent mode while a user swipes and reads aloud, while a local recording is created. Optionally, a local recording of user 102 may undergo post-processing to produce a reading score to track fluency progress.

Computing platform 100 may serve as an accessibility tool for a user who cannot read.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A non-transitory computer readable medium encoded with a computer program comprising instructions to cause a processor to:

identify user-selected pronounceable characters within material presented to a user based on a stream of 2-dimensional position data associated with the user;

audibly present the user-selected pronounceable characters as an audible presentation contemporaneous with motion of the user, wherein the audible presentation comprises one or more of pre-recorded human voice and synthesized speech;

periodically determine a difference between the 2-dimensional position data and a current point of the audible presentation;

smooth the differences between the 2-dimensional position data and a current point of the audible presentation, over time, to provide a first smoothed difference;

adjust a rate of the audible presentation based on the first smoothed difference to provide a rate-adjusted audible presentation contemporaneous with the motion of the user; and alter a pitch of the rate-adjusted audible presentation to counter the adjusted rate of the audible presentation.

2. The non-transitory computer readable medium of claim 1, further comprising instructions to cause the processor to:

adjust the rate of the audible presentation via an adaptive feedback system to reduce one or more of a difference between a current rate of the audible presentation and a current speed of the motion of the user, and a difference between the current point of the audible presentation and a current position of the user with respect to the user-selected pronounceable characters.

3. The non-transitory computer readable medium of claim 1, further comprising instructions to cause the processor to:

identify the user-selected pronounceable characters within one or more of graphics, illustrations, charts, graphs, mathematical expressions, and musical notations/scores of the material presented to the user.

4. The non-transitory computer readable medium of claim 1, further comprising instructions to cause the processor to:

demarcate meaningful phrases within material presented to the user based on one or more of punctuation in the material, metadata associated with the audible presentation, pauses in the audible presentation, and a computer model of a language of the audible presentation; and present visual indications of the demarcations in the material presented to the user.

5. The non-transitory computer readable medium of claim 4, further comprising instructions to cause the processor to:

alter a placement of the visual indications of the demarcations based on a reading proficiency of the user.

6. The non-transitory computer readable medium of claim 1, further comprising instructions to cause the processor to:

perform a remedial action if one or more of a position, a speed, and a direction of motion of the user meets a threshold.

7. The non-transitory computer readable medium of claim 6, further comprising instructions to cause the processor to: vary the threshold based on one or more of,
user input,
punctuation within the material,
visual demarcations,
contextual information related to the material; and
contextual information related to the user.

8. The non-transitory computer readable medium of claim 6, wherein the threshold comprises:
a first threshold that specifies a maximum permissible speed of the motion of the user, given contextual information related to the material; and
a second threshold that specifies a maximum permissible speed of the motion of the user, in the presence of punctuation marks of the material;
wherein the first threshold is higher than the second threshold.

9. The non-transitory computer readable medium of claim 1, further comprising instructions to cause the processor to: visually accentuate the user-selected pronounceable characters contemporaneous with the audible presentation.

10. The non-transitory computer readable medium of claim 9, further comprising instructions to cause the processor to:
periodically determine a difference between the 2-dimensional position data and the visually accentuated user-selected pronounceable characters;
smooth the differences between the 2-dimensional position data and the visually accentuated user-selected pronounceable characters, over time, to provide a second smoothed difference; and
adjust a rate of the visual accentuation based on the second smoothed difference to provide rate-adjusted visual accentuation contemporaneous with the motion of the user.

11. A method, comprising:
receiving a file and an audio file from a server, wherein the file comprises pronounceable characters and the audio file comprises pre-recorded human voice of the pronounceable characters;
displaying the pronounceable characters on a user device;
identifying user-selected pronounceable characters of the pronounceable characters displayed on the user device based on a stream of 2-dimensional position data associated with the user;
audibly presenting the user-selected pronounceable characters from the audio file, as an audible presentation, contemporaneous with motion of the user;
periodically determining a difference between the 2-dimensional position data and a current point of the audible presentation;
smoothing the differences over time to provide a smoothed difference;
adjusting a rate of the audible presentation based on the smoothed difference to provide a rate-adjusted audible presentation contemporaneous with the motion of the user; and
altering a pitch of the rate-adjusted audible presentation to counter the adjusted rate of the audible presentation.

12. The method of claim 11, wherein the adjusting comprises:
adjusting the rate of the audible presentation via an adaptive feedback system to reduce one or more of a difference between a current rate of the audible presentation and a current speed of the motion of the user, and a difference between the current point of the audible presentation and a current position of the user with respect to the user-selected pronounceable characters.

13. The method of claim 11, wherein the identifying comprises:
identifying the user-selected pronounceable characters within one or more of graphics, illustrations, charts, graphs, mathematical expressions, and musical notations/scores.

14. The method of claim 11, further comprising:
demarcating meaningful phrases of the file based on one or more of punctuation in the file, metadata associated with an audible recording of the file, pauses in the audible recording of the file, and a computer model of a language of the user-selected pronounceable characters; and
displaying the demarcations on the user device; and
altering a placement of the demarcations on the user device based on a reading proficiency of the user.

15. The method of claim 11, further comprising:
performing a remedial action if one or more of a position, a speed, and a direction of motion of the user meets a threshold; and
varying the threshold based on one or more of:
user input;
punctuation within the file;
visual demarcations;
contextual information related to the file; and
contextual information related to the user.

16. The method of claim 11, further comprising:
visually accentuating the user-selected pronounceable characters contemporaneous with the audible presentation.

17. A system, comprising:
a user device comprising a processor and memory that stores instruction that, when executed by the processor, cause the processor to:
receive a file from a server, wherein the file comprises pronounceable characters;
display the pronounceable characters on the user device;
identify user-selected pronounceable characters of the pronounceable characters displayed on the user device based on a stream of 2-dimensional position data associated with the user;
audibly present synthesized audio of the user-selected pronounceable characters as a synthesized audible presentation at the user device, contemporaneous with motion of the user;
periodically determine a difference between the 2-dimensional position data and a current point of the synthesized audible presentation;
smooth the differences over time to provide a smoothed difference;
adjust a rate of the synthesized audible presentation based on the smoothed difference to provide a rate-adjusted synthesized audible presentation contemporaneous with the motion of the user; and
alter a pitch of the rate-adjusted synthesized audible presentation based on the rate-adjusted synthesized audible presentation.

18. The system of claim 17, wherein the instructions further cause the processor to:
demarcate meaningful phrases within the pronounceable characters based on one or more of punctuation amongst the pronounceable characters, metadata associated with the file, and a computer model of a language of the synthesized audible presentation; and present visual indications of the demarcations in the pronounceable characters presented to the user.

19. The system of claim 17, wherein the instructions further to cause the processor to:

perform a remedial action if one or more of a position, a speed, and a direction of motion of the user meets a threshold; and vary the threshold based on one or more of:

user input;

punctuation amongst the pronounceable characters;

visual demarcations;

contextual information related to the file; and contextual information related to the user.

20. The system of claim 17, wherein the instructions further cause the processor to:

visually accentuate the user-selected pronounceable characters contemporaneous with the audible presentation.

* * * * *